United States Patent
Castro et al.

(10) Patent No.: US 12,034,476 B2
(45) Date of Patent: Jul. 9, 2024

(54) APPARATUS AND METHODS FOR AN OPTICAL MULTIMODE CHANNEL BANDWIDTH ANALYZER

(71) Applicant: Panduit Corp., Tinley Park, IL (US)

(72) Inventors: Jose M. Castro, Naperville, IL (US); Richard J. Pimpinella, Frankfort, IL (US); Bulent Kose, Burr Ridge, IL (US); Yu Huang, Orland Park, IL (US); Fei Jia, Tinley Park, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 17/559,659

(22) Filed: Dec. 22, 2021

(65) Prior Publication Data
US 2022/0271834 A1      Aug. 25, 2022

Related U.S. Application Data

(60) Provisional application No. 63/135,183, filed on Jan. 8, 2021.

(51) Int. Cl.
*H04B 10/077* (2013.01)
*H04B 10/071* (2013.01)
(Continued)

(52) U.S. Cl.
CPC ....... *H04B 10/0775* (2013.01); *H04B 10/071* (2013.01); *H04B 10/073* (2013.01); *H04B 10/2581* (2013.01)

(58) Field of Classification Search
CPC ............ H04B 10/0775; H04B 10/2581; H04B 10/073; H04B 10/071
(Continued)

(56) References Cited

U.S. PATENT DOCUMENTS 9,194,763 B2 *  11/2015  Hu .................... H04B 10/071
9,417,382 B2 *   8/2016  Pimpinella ......... G02B 6/02214
(Continued)

FOREIGN PATENT DOCUMENTS

| | | | | |
|---|---|---|---|---|
| CN | 102804647 A | * | 11/2012 | ......... G01M 11/338 |
| JP | H0843533 A | * | 2/1996 | ........... H01S 3/2383 |
| JP | 2006084177 A | * | 3/2006 | |

OTHER PUBLICATIONS

Jose M. Castro, "Investigation of the Interaction of Modal and Chromatic Dispersion in VCSEL-MMF Channels", IEEE Aug. 1, 2012 (Year: 2012).*
(Continued)

*Primary Examiner* — Abbas H Alagheband
(74) *Attorney, Agent, or Firm* — Christopher S. Clancy; James H. Williams; Christopher K. Marlow

(57) ABSTRACT

A test apparatus has at least one optical source, a high-speed photodetector, a microcontroller or processor, and electrical circuitry to power and drive the at least one optical source, photodetector, and microcontroller or processor and for measuring the frequency response of a multimode optical fiber under test. The test apparatus can utilize an optical pulse waveform with a light adapter to measure of the channel under test. It can also uses a correction method to de-embed a chromatic bandwidth of the source from the encircled flux modal chromatic bandwidth. The correction method can use correction functions obtained for different type of VCSELs to estimate the optical channel bandwith when used with VCSEL transceivers.

8 Claims, 21 Drawing Sheets

(51) Int. Cl.
*H04B 10/073* (2013.01)
*H04B 10/2581* (2013.01)

(58) Field of Classification Search
USPC .......................................................... 398/16
See application file for complete search history.

(56) References Cited

U.S. PATENT DOCUMENTS

| | | | | |
|---|---|---|---|---|
| 9,977,182 | B2* | 5/2018 | Pimpinella | G02B 6/0288 |
| 2011/0096563 | A1 | 4/2011 | Levin et al. | |
| 2014/0368809 | A1* | 12/2014 | Chen | G01M 11/335 |
| | | | | 356/73.1 |
| 2015/0086161 | A1* | 3/2015 | Bickham | G02B 6/268 |
| | | | | 385/124 |
| 2016/0025923 | A1* | 1/2016 | Castro | G02B 6/0288 |
| | | | | 385/124 |
| 2016/0041332 | A1* | 2/2016 | Pimpinella | G06F 30/00 |
| | | | | 703/2 |
| 2016/0202418 | A1* | 7/2016 | Fortin | G02B 6/0288 |
| | | | | 385/137 |
| 2016/0258840 | A1* | 9/2016 | Kobayashi | G01M 11/33 |
| 2017/0315018 | A1* | 11/2017 | Castro | H04B 10/0795 |
| 2018/0267234 | A1* | 9/2018 | Pimpinella | G02B 6/0288 |
| 2018/0372582 | A1* | 12/2018 | Liu | G02B 6/422 |
| 2020/0057191 | A1* | 2/2020 | Parsons | G01M 11/338 |
| 2020/0174183 | A1* | 6/2020 | Pimpinella | H04B 10/071 |

OTHER PUBLICATIONS

Jose M. Castro, et al., Investigation of the Interaction of Modal and Chromatic Dispersion in VCSEL-MMF Channels. Journal of Lightwave Technology, vol. 30, No. 15, Aug. 1, 2012 (Year: 2012).*
Jose M Castro et al: "Investigation of the Interaction of Modal and Chromatic Dispersion in VCSEL MMF Channels", Journal of Lightwave Technology, IEEE, USA, vol. 30, No. 15, Aug. 1, 2012 (Aug. 1, 2012), pp. 2532-2541, XP011451187, ISSN: 0733-8724, DOI: 10.1109/JLT.2012.2203351.

* cited by examiner

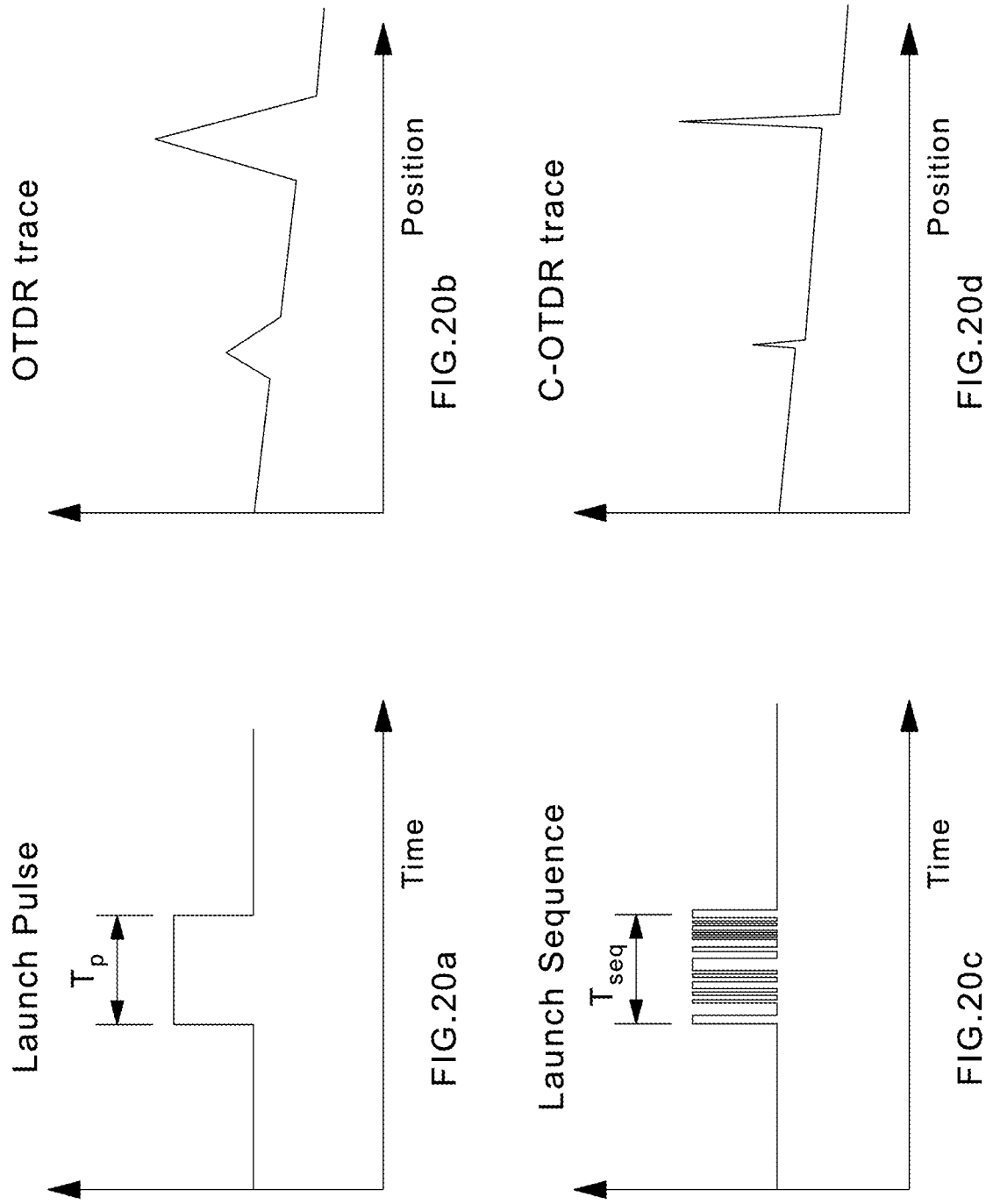

APPARATUS AND METHODS FOR AN OPTICAL MULTIMODE CHANNEL BANDWIDTH ANALYZER

CROSS-REFERENCE TO RELATED APPLICATIONS

This application claims benefit to U.S. Provisional Patent Application No. 63/135,183, filed on Jan. 8, 2021, the entirety of which is hereby incorporated by reference herein.

FIELD OF THE INVENTION

The present invention relates generally to the measurement of optical fibers and more specifically to handheld device that measures the bandwidth of multi-mode optical fiber channels in one or more spectral regions.

BACKGROUND

Graded-index multimode optical fibers with laser-optimized bandwidth characteristics are classified as optical multimode OM3, OM4, or OM5, according to their measured minimum effective modal bandwidth (EMB). The minimum EMB thresholds defined in TIA and IEC Standards are 2000 MHz-km for OM3, and 4700 MHz-km for OM4 and OM5 at the nominal operating wavelength of 850 nm [1].

Often, the EMB is measured using two samples of less than 1 km from each end of a spool of fiber that typically contains about 8.8 km or 17.6 km of fiber. The EMB method assumes that the two end samples are representative of all the fiber in the spool, which is not consistent with the manufacturing variation observed for some fiber manufacturers.

In general there is low correlation between the fiber's EMB and the channel's bit error rate performance when connected to Vertical Cavity Surface Emitting Laser (VCSEL) based transceivers. The source of the poor correlation is the spatial emission pattern of the light spectrum of the VCSEL and the coupling of VCSEL modes to fiber modes, which also depends on the launch conditions within the transmitter optical sub-assembly (TOSA). Evaluation of several hundreds of differential mode delay (DMD) and EMB test measurements according to TIA/IEC standards [1-2], indicates that EMB tends to underestimate or overestimate the actual bandwidth of the fiber when coupled to 850 nm VCSELs as a result of the interaction of modal and chromatic dispersions. Since the OM3, OM4, and OM5 fiber categories only indicate the lower limit EMB for the case of modal dispersion only, the actual fiber bandwidth of the installed optical cable when used with a VCSEL is unknown.

There is a increasing need to reduce the uncertainty in the estimation of the modal or modal-chromatic bandwidth of the multimode optical channel in order to reliably upgrade to newer higher speed applications using pulse amplitude modulation schemes such as PAM-4, or multi-wavelength transceivers. Due to the lack of accurate information of the channel bandwidth, datacenter managers cannot, with a high level of confidence, upgrade their channels to higher data rates. In most cases today, the only option is to replace all the fiber in the channel.

SUMMARY

A test apparatus has at least one optical source, a high-speed photodetector, a microcontroller or processor, and electrical circuitry to power and drive the at least one optical source, photodetector, and microcontroller or processor and for measuring the frequency response of a multimode optical fiber under test. The test apparatus can utilize an optical pulse waveform with a light adapter to measure of the channel under test. It can also use a correction method to de-embed a chromatic bandwidth of the source from the encircled flux modal chromatic bandwidth. The correction method can use correction functions obtained for different type of VCSELs to estimate the optical channel bandwidth when used with VCSEL transceivers.

BRIEF DESCRIPTION OF THE FIGURES

FIG. 20(a) depicts the launch pulse showing the optical attenuation with position and two reflective events.

FIG. 20(b) illustrates the optical time-domain reflectometer (OTDR) output trace showing the optical attenuation with position and two reflective events.

FIG. 20(c) shows a specially selected pseudorandom binary sequence can be used instead of a single pulse as shown.

FIG. 20(d) shows the reflected signal is correlated with a reference signal and correlation peaks are found.

DETAILED DESCRIPTION OF THE INVENTION

A specially selected pseudorandom binary sequence can be used instead of a single pulse as shown in FIG. 20(c). A PRBS, has low cross-correlation, and can be used to implement a correlation OTDR, C-OTDR. The reflected signal is correlated with a reference signal and correlation peaks are found as shown in FIG. 20(d). The delay can be converted to optical length as described before.

Figure 1:
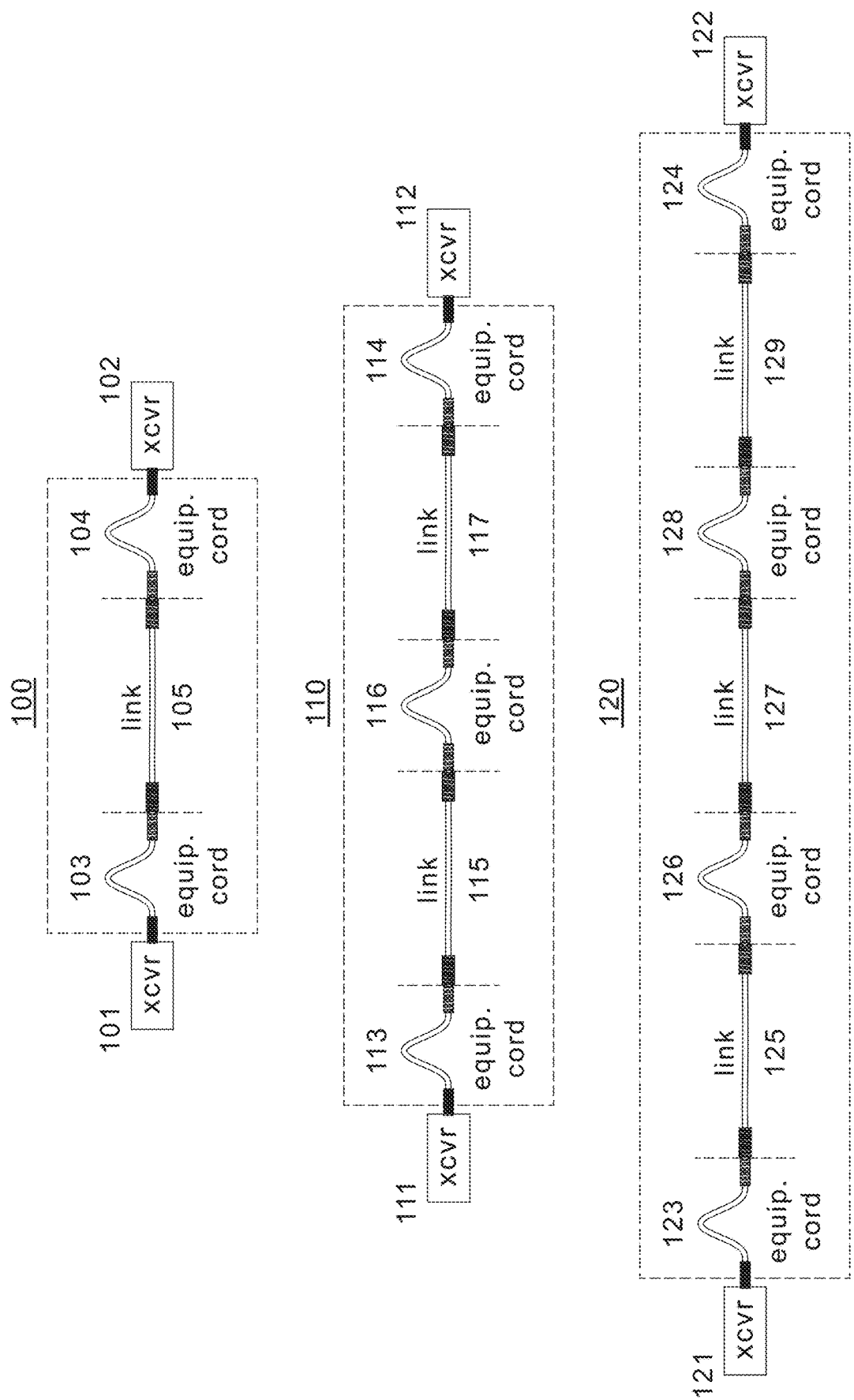
FIG. 1 shows a single, double, and triple link channel.

Typical structured cabling implementations in today's datacenters are shown in FIG. 1. In the figure, 100 represents a single link channel which consists of equipment cords 103 and 104, and fiber trunk cable 105. Typically, the length of the trunk cable channel link 105 is significantly longer than the equipment cords 103 and 104. Therefore, the bandwidth of the cable's fiber is the dominant bandwidth of the single link channels. In the same figure, a more common structure cabling implementation is the double-link channel 110, comprising equipment cords 113 and 114, trunk cables 115 and 117, and cross-connect patch cord 116. There are more connector interfaces, and therefore, more channel losses. Also, there are more mix of fibers that will impact the total channel bandwidth. The total bandwidth of a triple link channel 120, depends on links 125, 127, and 129.

Hence, due to the uncertainty in multimode total channel bandwidth, upgrades to higher data rates are unreliable, and consequently, there is a need for a low cost portable handheld bandwidth analyzer. In this disclosure, we describe novel portable apparatuses, significantly less costly than traditional DMD/EMB measurement systems, and methods to measure modal and modal-chromatic bandwidth to determine if the IEEE 802.3 Ethernet or Fiber Channel applications can be supported by the channel.

Accurate measurements of effective modal bandwidth requires the use of very stable lasers with short pulse durations, and very narrow spectral width to minimize the effect of chromatic dispersion [1]. The utilization of directly modulated semiconductor lasers such as VCSELs for modal bandwidth estimation of multimode fiber (MMF) channels, could significantly reduce the cost, power consumption, and complexity of the test, enabling the production of portable modal-bandwidth testers. However, the large spectral width of the VCSEL, its spectral dependent coupling [2] and non-linear-time invariant (NLTI) responses, increases the uncertainty of the measurements making its use impractical.

The fundamental chromatic and coupling effects in MMF are generally known by industry experts. However, the impact of the detrimental NLTI effects on the estimation of modal bandwidth, and methods to overcome the VCSEL impairments on the measurement if modal bandwidth have not been previously disclosed.

In this disclosure we describe a new model that can predict the effect of direct modulated VCSELs on channel bandwidth measurements. In this model, we initially assume the VCSEL-MMF channel can be represented by a linear time invariant (LTI) system where the relationship between an input signal $s_1(t)$ and output signal $s_0(t)$ of the channel is given by, $$s_O(t)=s_1(t) \otimes h_M(t) \otimes h_{Ch}(t),$$

where, $\otimes$ is the convolution operator, $h_M(t)$ the fiber impulse response and the VCSEL impulse response over a MMF with negligible modal dispersion is estimated using, $$h_{Ch}(t)=\Sigma_k V_k \delta(t-\tau_k),$$

where, k is the index for each VCSEL mode, $V_k$ is the power in each VCSEL mode, $\delta(t)$ is the Dirac delta function, and $\tau_k$ represents the delays produced by the chromatic dispersion of the fiber. Both $s_1(t)$ and $s_0(t)$ are positive signals representing the optical power.

Each VCSEL mode is associated with a resonance wavelength $\lambda_k$, and a center wavelength $\bar{\lambda}$, given by, $$\bar{\lambda} = \left(\sum_k V_k \lambda_k\right) / \sum_k V_k$$

For VCSELs used in data center transceivers, where $(\lambda_k-\bar{\lambda})/\bar{\lambda} \ll 1$ the delays due to chromatic dispersion are given by, $$\tau_k = -D\{\bar{\lambda}\}(\lambda_k-\bar{\lambda})L$$

where L is the length of the channel and $D(\bar{\lambda})$ is the chromatic dispersion parameter of the fiber at $\bar{\lambda}$. In the frequency domain the spectrum of the output signal is given by, $$S_O(f)=S_1(f)H_M(f)H_{Ch}(f)$$

where, $H_M(f)$ and $H_{Ch}(f)$ are the Fourier transforms of the modal and chromatic dispersions respectively.

The model described above is simplistic, since it does not include the effects of the launch condition, the coupling spectral bias [2], and mode power fluctuation [3]. Due to factors, each VCSEL mode tend to couple preferably to different modes in MMF [2] and therefore, each VCSEL mode is affected by a different modal impulse response represented by $h_M^k(t)$, producing, $$s_O = \sum_k V_k s_1(t) \otimes h_M^k(t-\tau_k)$$

where, $h_M^k(t) > 0$ for all t instances.

The Fourier transform of the output signal is given by, $$S_O(f) = \sum_k V_k S_1(f) H_M^k(f) e^{-2\pi i f \tau_k}$$

and the LTI modal-chromatic transfer function is given by, $$H_{mc}(f) = \frac{S_O(f)}{S_1(f)} = \sum_k V_k H_M^k(f) e^{-2\pi i f \tau_k}$$

Several types of NLTI effects impact the LTI model described above. The first one, related to the IV curves of the semiconductor laser, can be controlled by selecting a proper bias and modulation current. However, careful tuning is required since the bias current impacts on the rise time, the spectral width, and the noise of the VCSEL. Some benefits of an improved rise time due to higher bias can be negated by broadening the spectral width thereby increasing the chromatic dispersion, and reducing the optical modulation amplitude (OMA).

The power fluctuation among VCSEL modes produces a time-variant channel, with variation depending on the transmitted waveform and laser noise. When the power fluctuation is included in the model, the signal output including power fluctuation among VCSEL modes is given by, $$s_O(t) = \Sigma_k [V_k s_1(t) - \Sigma_j g_{k,j}(t)] \otimes h_M^k(t - \tau_k),$$

where, $g_{k,j}(t)$ represents the power fluctuation among VCSEL modes k to j. This power fluctuation has a deterministic (non-linear waveform dependence) component as described in [3] as well as a non-deterministic noise component. Assuming low relative intensity noise (RIN), at a given time the power transferred from mode k to mode j is equal to the power received by mode j from k. Therefore, we can modify the previous equation using, $g_{k,j}(t) = -g_{j,k}(t)$ yielding, $$\tilde{S}_O(f) = \sum_k \left[ V_k S_I(f) H_M^k(f) e^{2\pi i f \tau_k} - \sum_k \sum_{j>k} G_{k,j}(f) \right]$$

$$(H_M^k(f) e^{2\pi i f \tau_k} - H_M^j(f) e^{2\pi i f \tau_k}) = S_O(f) + \Phi(f)$$

The noise component $G_{k,j}(f)$, which distorts the spectrum of the input, is signal multiplied by the difference of transfer functions of mode k and j. This difference in the frequency domain can produce high-passband filter effects that distort the spectrum of the received signal and therefore, the transfer function. The previous equations can be modified to obtain a more realistic transfer function of VCSEL-MMF channels as follows, $$\tilde{H}_{MC}(f) = \frac{s_O(f)}{s_I(f)} = \sum_k V_k H_M^k(f) e^{-2\pi i f \tau_k} + \frac{\Phi(f)}{s_I(f)} = H_{MC}(f) + e^{\theta(f)},$$

where $\theta(f)$ is a complex valued function representing the determinist and random noise in the modal-chromatic transfer function. This noise effect can produce in some cases overestimation of the bandwidth, and consequently make it difficult to deconvolve the modal from the modal chromatic bandwidth.

In addition to the impairments described above, the linewidth enhancement for each VCSEL mode can also produce a transfer function with overestimated bandwidth [4]. All the above mentioned impairments have a dependence on temperature, which introduces more variation in the bandwidth estimation.

Due to these noise factors, the inventors have observed variation on the order of 100% between modal-chromatic and modal bandwidth. Therefore, although VCSELs can provide a power efficient and cost-effective way to measure modal bandwidth, currently there is no reliable method to provide accurate measurement for a portable tool product.

We describe different approaches to overcome these limitations for accurate bandwidth estimation. These methods include control of launch condition, suppression of mode selective bias (MSB), calibration, and selection of the VCSELs using a reference VCSEL and a set of fibers denominate "Encircle Flux Fiber Dispersion Reference Modules," EF-FDRM.

An apparatus according to the present invention, is a handheld device that measures the bandwidth of multi-mode optical fiber channels in one or more spectral regions, e.g., 850 nm and/or 950 nm, and estimates the performance of IEEE Ethernet and/or Fiber channel applications when used with VSCEL transceivers.

The apparatus uses direct modulated semiconductor VCSEL lasers to reduce the cost, size, and power requirements of the test apparatus. Among all semiconductor lasers, the VCSELs used in MMF transceivers have cost and reliability advantages. Moreover, they operate in the same wavelength range as specified in the Ethernet and Fiber Channel applications. However, as previously mentioned direct modulated VCSELs introduce uncertainty in the bandwidth estimation due to the impairments.

Figure 2:
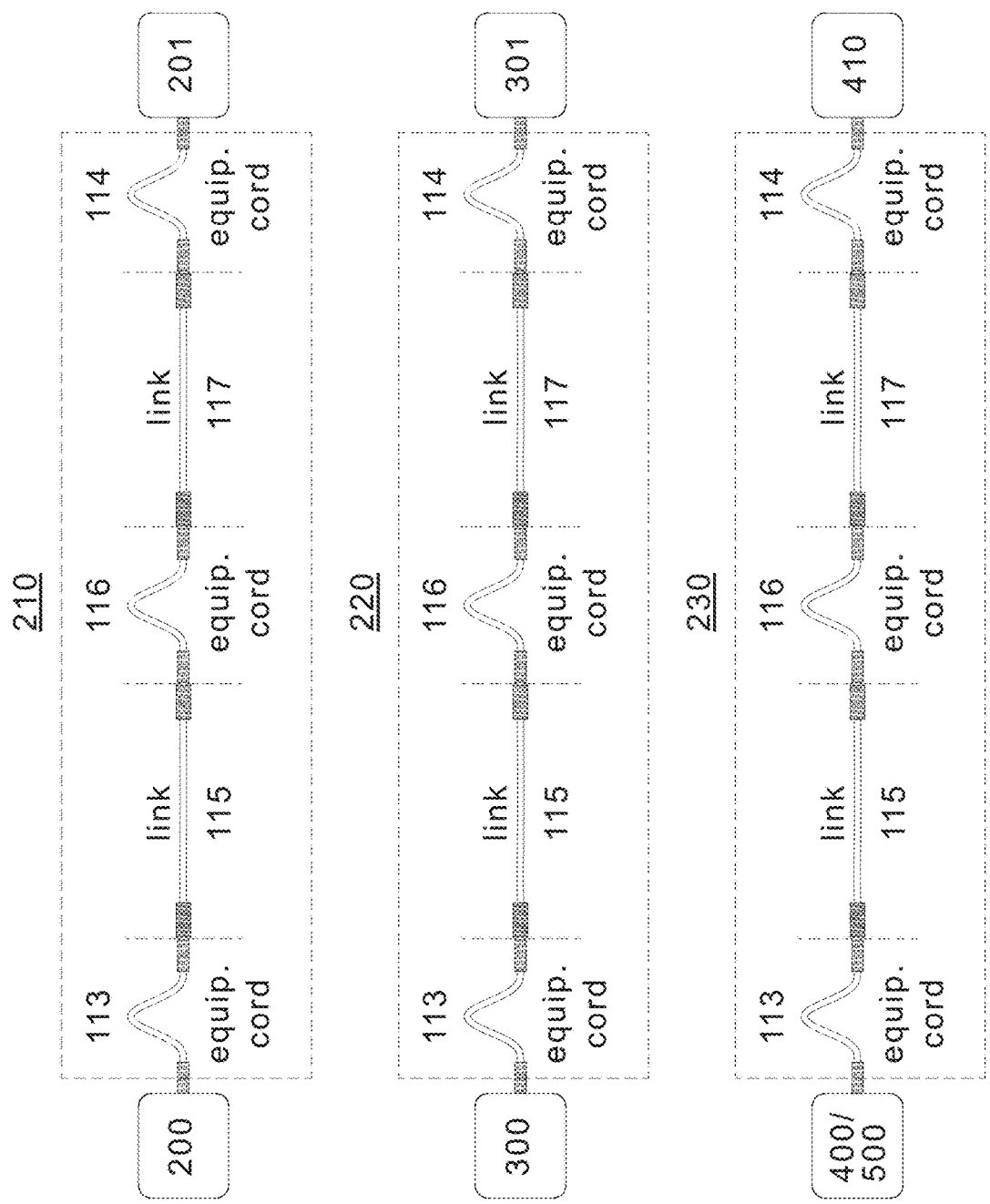
FIG. 2 shows three embodiments of an optical multimode channel bandwidth analyzer.

In this disclosure we describe four embodiments and methods to minimize the uncertainty in bandwidth measurements using VCSELs. The embodiments provide different test modes as shown in FIG. 2. For exemplary purposes, a double link channel is shown. In the first embodiment 210, a main unit 200 is connected to one side of the channel (near end) to transmit test signals, and a remote unit 201 is connected to the far end of the channel to receive the test signals. In this first embodiment, the measurement can only be done in one direction, i.e., unit 200 to unit 201 (near end to far end).

In the second embodiment 220, the transmission and receiving functionalities are combined into a single unit shown as 300 and 301 in the Figure. Therefore, the channel can be tested from both the near and from the far end, which enables the testing duplex channels without moving connections between tester and channel. Also, in cases where both the near and far end are accessible, e.g., fiber in a spool, only one test unit is needed to measure the bandwidth.

The third and fourth embodiment, 230, shown operate with a high-reflectivity and low-loss passive reflector 410 placed at the far end, so that test signals can be transmitted and received from one end.

Figure 3:
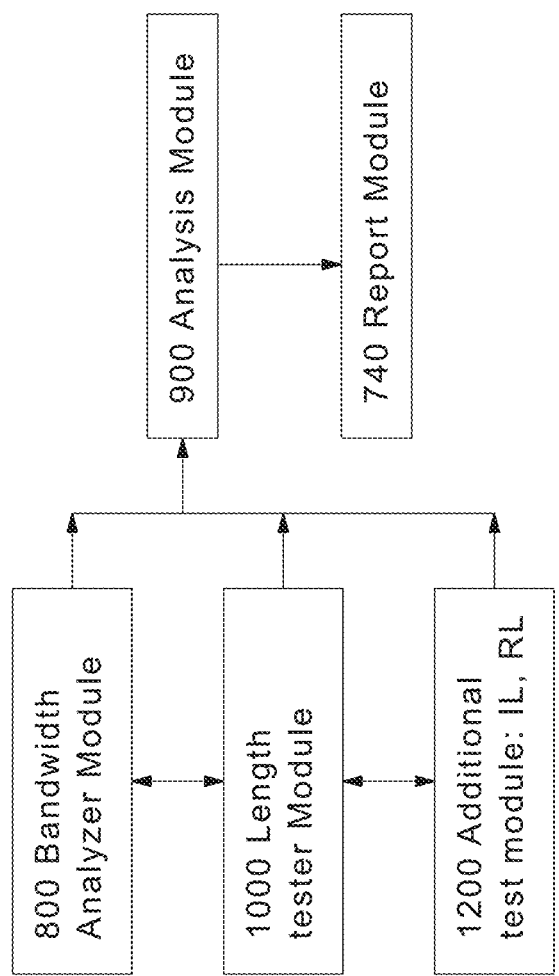
FIG. 3 is a flow chart showing how the transmission and reception capabilities can be combined in the second embodiment.

Depending on the implemented hardware, each embodiment can utilize the complete set or a subset of the functionalities shown in FIG. 3. Each functionality consists of a set of algorithms described in other sections of this disclosure. All the embodiments require a factory calibration method 1500, described later in this document.

Embodiment 1

Figure 4:
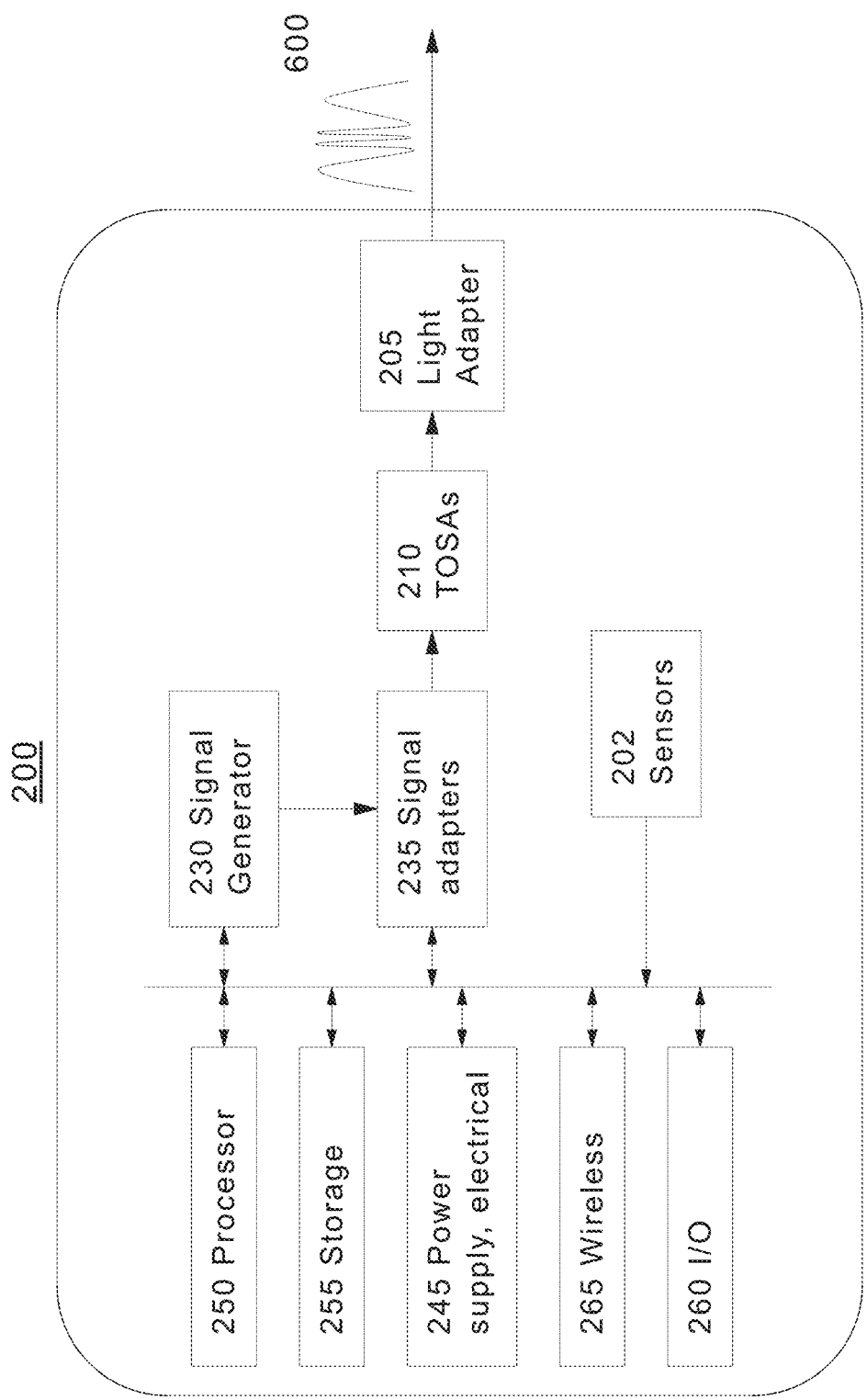
FIG. 4 shows the components of the main unit of embodiment 1.
Figure 5:
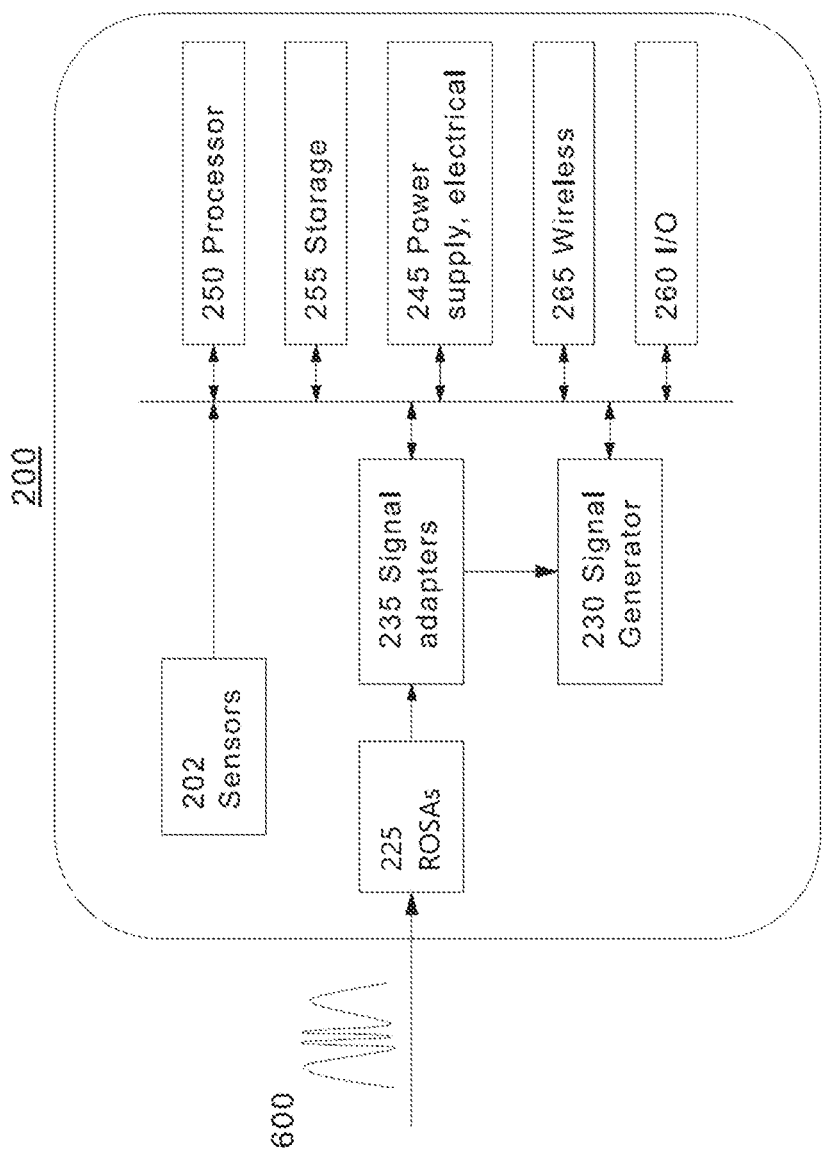
FIG. 5 shows the components of the remote unit of embodiment 1.

The components of the main unit 200 and remote unit 201, are shown in FIGS. 4 and 5. The main unit 200, includes the TOSA 210, each having at least one laser, and optical coupling components, e.g., lenses or diffractive optics for coupling light from the laser to a fiber. Each TOSA in 210 is connected to a light adapter 205, designed to provide a stable and repeatable launch condition, e.g., encircled flux (EF) compliant launch. The output of the light adapter 205, uses a typical optical connector, e.g., LC, FC, SC, CS, SN, MPO, to provide connections to the channel under test. For embodiments using multi-fiber connectors such as the MPO or CS connector, the TOSAs 210, utilize multiple light sources. Alternatively, utilizing an optical splitter, TOSA 210 can split the optical power and launch the signal among multiple optical fibers.

For measuring bandwidth at different wavelengths, TOSA 210 can include multiple lasers operating at different wavelengths. For example, TOSA 210 can include four VCSELs operating at 850 nm, 880 nm, 930 nm, and 950 nm, or two separate TOSAs with lasers operating at 850 nm and 950 nm. This multiple VCSEL TOSA emplimentation can enable full characterization of bandwidth for multi-wavelength transmission.

A sensor, or set of sensors, 202 can be placed near the TOSA to measure temperature. The temperature is used to tune calibration parameters and functions obtained during calibration, 1500.

Electronics circuits for signal adaptation and biasing 235, can be connected to TOSA 210. For example, 235, can include bias-T devices to provide an optimized current bias to the lasers. The laser bias circuits in 235 would be tuned to provide enough optical power, fast rise time, and low relative intensity noise, avoiding broadening of the linewidth or spectral width while maintaining extinction ratio >2. Also, drivers, high bandwidth amplifiers, pre-emphasis, or low pass filters, included in 235 are used to compensate for bandwidth limitation and to reduce the system noise.

The signal generator module, 230, provides the waveforms 600, used for testing. The waveforms can be generated using a processor 250. Alternatively, the waveforms can be retrieved from the unit memory 255. The waveforms 600, can be selected from a set of pseudo-random binary sequences (PBRS) of arbitrary size depending on the processor's capacity or memory size. The test waveform can also be sinusoidal signals of various frequencies, or chirped signals where the signal frequency changes as a function of time at a predetermined rate. The waveforms selected for testing minimizes the degradation in the SNR due to TOSA 210.

The processor module 250, consists of a microprocessor and/or µ-controller elements. This module executes the algorithms and digital signal processing (DSP) shown in FIG. 3, and controls the I/O module 260, and storage module 255. In addition, processor module 250, manages communication and power distribution/recharging tasks to the wireless module 265, and power module 245.

The storage module 255, includes volatile or non-volatile memory used to process data and store results. The power module 245 provides power to all components in the unit. It includes a rechargeable or non rechargeable set of batteries and the components necessary to connect to an electrical power source. The power module 245 can have electrical circuits to check battery levels and to control the power recharging processes.

The wireless unit 265, enables WiFi or Bluetooth communication with computers or mobile devices. The I/O module 260, includes interfaces such as display and buttons to control the unit, and USB ports to enable data or power (for battery recharge) transmission.

The components of the remote unit, 201, shown in FIG. 5 includes at least one receiver optical sub-assembly (ROSA) 225, which has at least one high bandwidth photodetector for optical/electrical conversion, and optics for coupling to a fiber. Electronics circuits for signal adaptation and bias 235, are connected to the ROSA to maintain signal integrity during optical/electrical conversion. For example 235, can include reverse bias circuitry, high bandwidth low noise amplifiers, and filters to compensate for received waveform 610 degradation after propagating to the channel under test. Also depending on the utilized waveforms, it can include microwave mixers to translate high frequency signals to more suitable speeds required for a portable tool.

A sensor or set of sensors 202, are optionally placed near the ROSA to measure temperature. The temperature of the ROSAs, might be used to tune calibration parameters as described elsewhere in this document.

Most of the functions of processor module 250, and storage component 255, in the remote head 201 are similar to the ones described for the main unit 200. For example, the management of the I/O module 260, control of the storage module 255, algorithm execution, DSP, management of wireless communication module 265, and power module 245.

The I/O module 260, can include buttons to control the unit, a display, e.g., LCD or LEDs, and USB ports to enable data transmission or power charging. The remote unit, 201, can be simplified by allowing it to be controlled by the main unit, 200 wirelessly. Also, the fiber under test can be used as the media to transmit the control signals.

Embodiment 1 can also use a transceiver instead of discrete TOSA and ROSA components. In this configuration, the main and remote units use pre-calibrated transceivers. The transceiver would replace modules 210 and 225 in the main unit as well as the remote unit shown in FIGS. 4 and 5. However, a requirement for this configuration is that the transceivers use receivers with linear amplifiers instead of limiting amplifiers.

Embodiments 2

Figure 6:
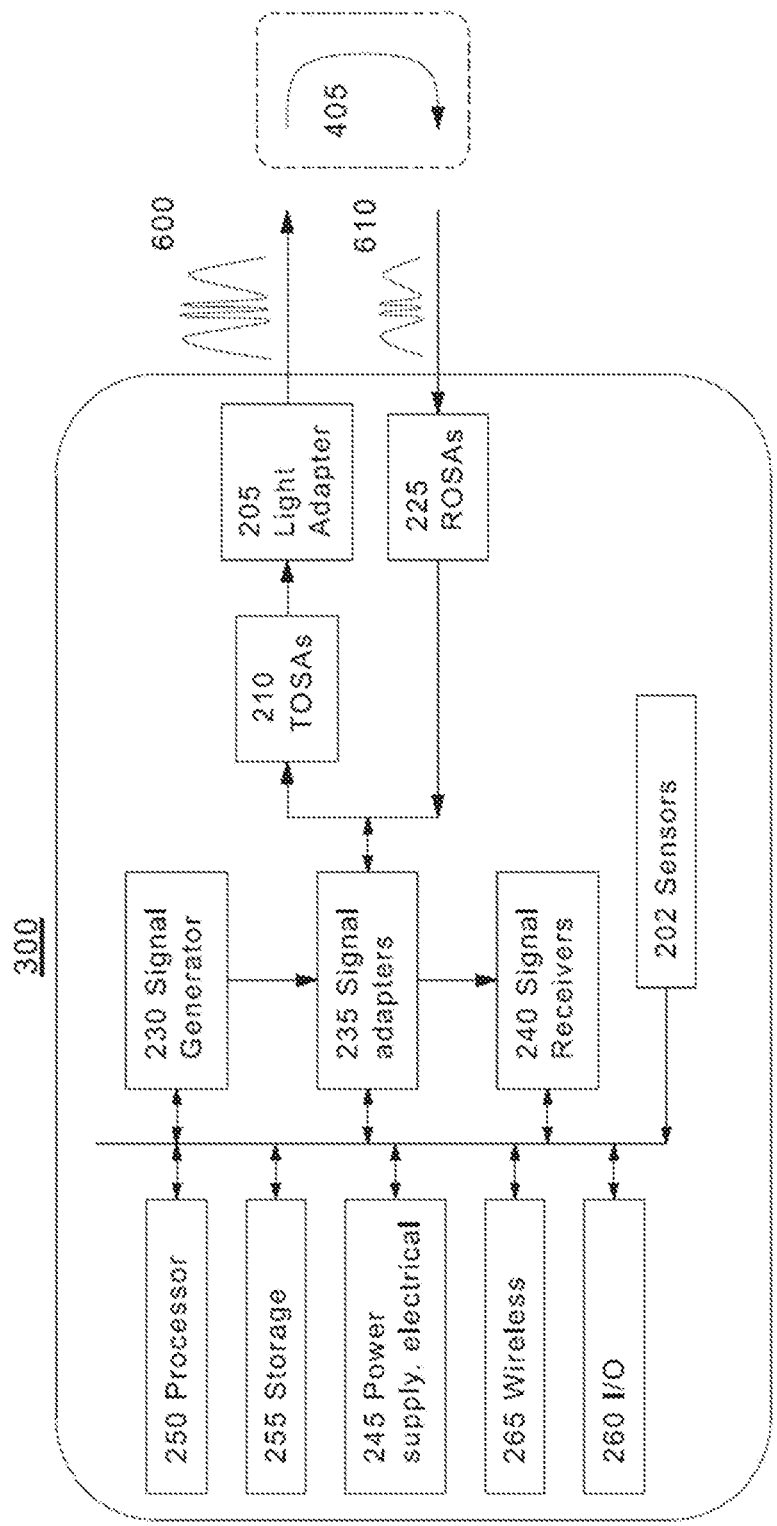
FIG. 6 shows how the functionalities of the main and remote units can be combined into one unit in embodiment 2.

This embodiment combines functionalities of the main and remote units (200 and 201) of embodiments 1 into unit 300 and 301 as shown in FIG. 6. Both 300 and 301 units have identical functionalities. These units enable simultaneous testing of duplex channels reducing the total testing time. Modules included in embodiments 2, such as the processor, 250, storage 255, power supply 245, wireless module 265, the I/O 260, signal generator 230, the signal adapters 235, signal receiver 240, the sensor 202, TOSA 210, ROSA 225, and the light adapter module 205, are similar to embodiment 1. Communication between the main and remote modules can be done via wireless or using the channel under test.

Embodiments 3

Embodiments 1 and 2 require two active devices connected at both the near-end and far-end of the channel under test to perform the measurement. This increases the complexity and cost of the apparatus since it duplicates many components and functionalities and requires the synchronization of local and remote units.

Another disadvantage of embodiments 1 and 2, is related to the measurement of short-length channels. In the case of high bandwidth short-length channels, e.g., 50 meters, these first two embodiments require high resolution and therefore, more costly high bandwidth TOSAs and ROSAs. Embodiment 3, 400, shown in FIG. 7, overcomes this limitation by measuring the bandwidth of a reflected signal. The signal is reflected by the reflector component 410 shown in the bottom left of the figure. The reflector consists of an optical adapter and and optical reflector.

Utilizing an optical splitter 220, the reflected signal undergoing a second pass through the fiber under test is redirected to ROSA, 225. Electronics circuits for signal adaptation and bias 235, are connected to the ROSA to maintain signal integrity during optical/electrical conversion.

Hence, the bandwidth measurement is made over twice the channel length by doubling the optical path for the received waveform 610. This feature relaxes the requirement of TOSA and ROSA for measurements of short channels, or high bandwidth fiber.

Figure 7:
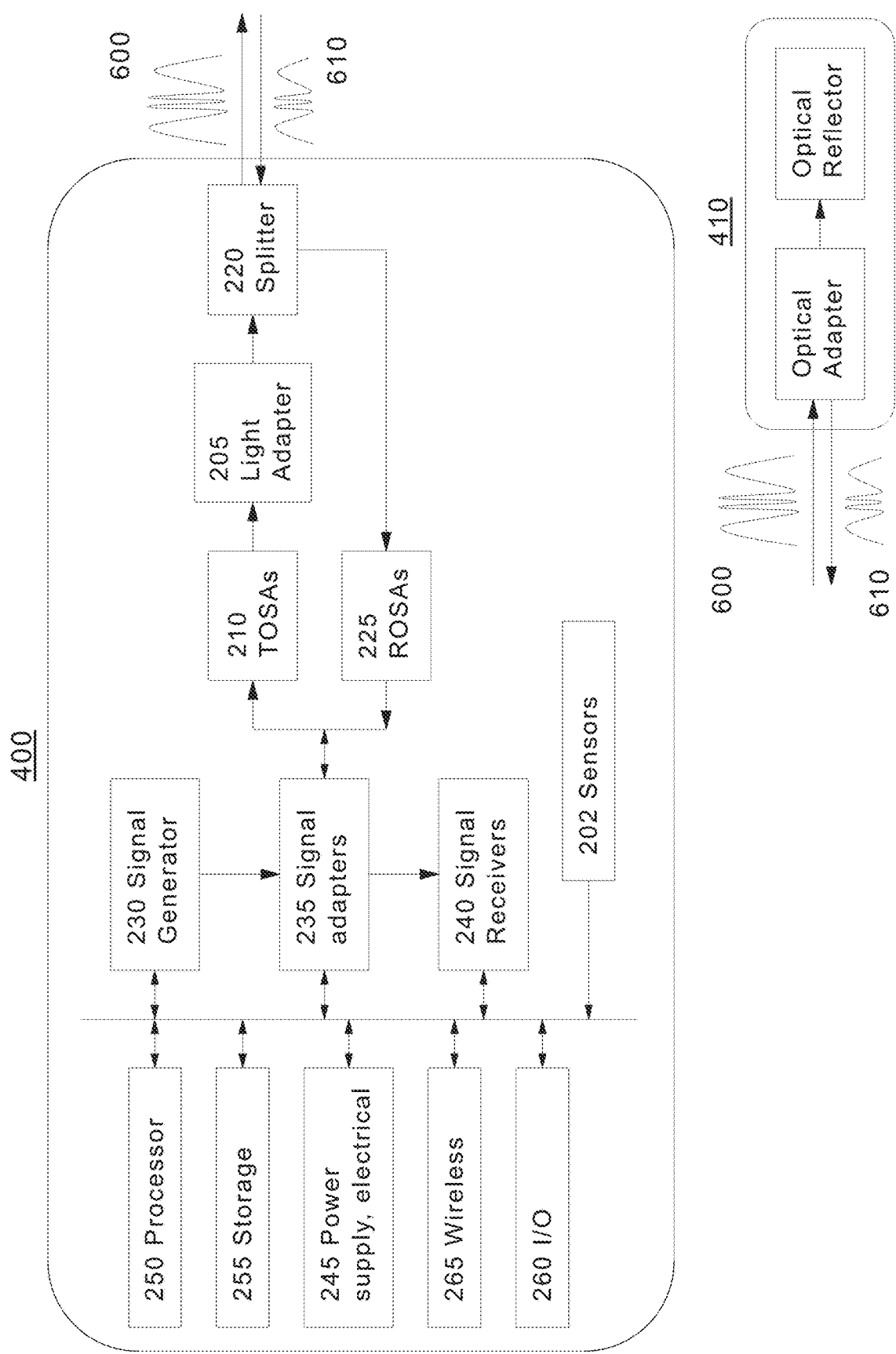
FIG. 7 shows the components of embodiment 3 which also measures the bandwidth of a reflected signal.

It is advantageous to place the splitter, 220, after light adapter 205, as shown in FIG. 7. In this configuration, the reflected signal does not double pass through the light adapter 205, minimizing the signal attenuation. However, this configuration requires splitters that do not change the MPD produced by the light adapter 205. It is understood the splitter 220, can be placed between the TOSAs 210 and the light adapter 205. Configurations with higher attenuation require TOSAs, 210 with higher power lasers to overcome additional losses. Embodiment type 3 uses a high-reflectivity reflector 410, to improve the signal to noise (SNR) of reflected signals.

Modules of embodiments 3, would typically include a processor 250, storage 255, power supply 245, wireless interface 265, I/O 260, signal generator 230, signal adapters 235, signal receiver 240, sensor 202, TOSA 210, ROSA 225, and the light adapter module 205, as described in previous sections of this document.

Embodiments 4

Figure 8:
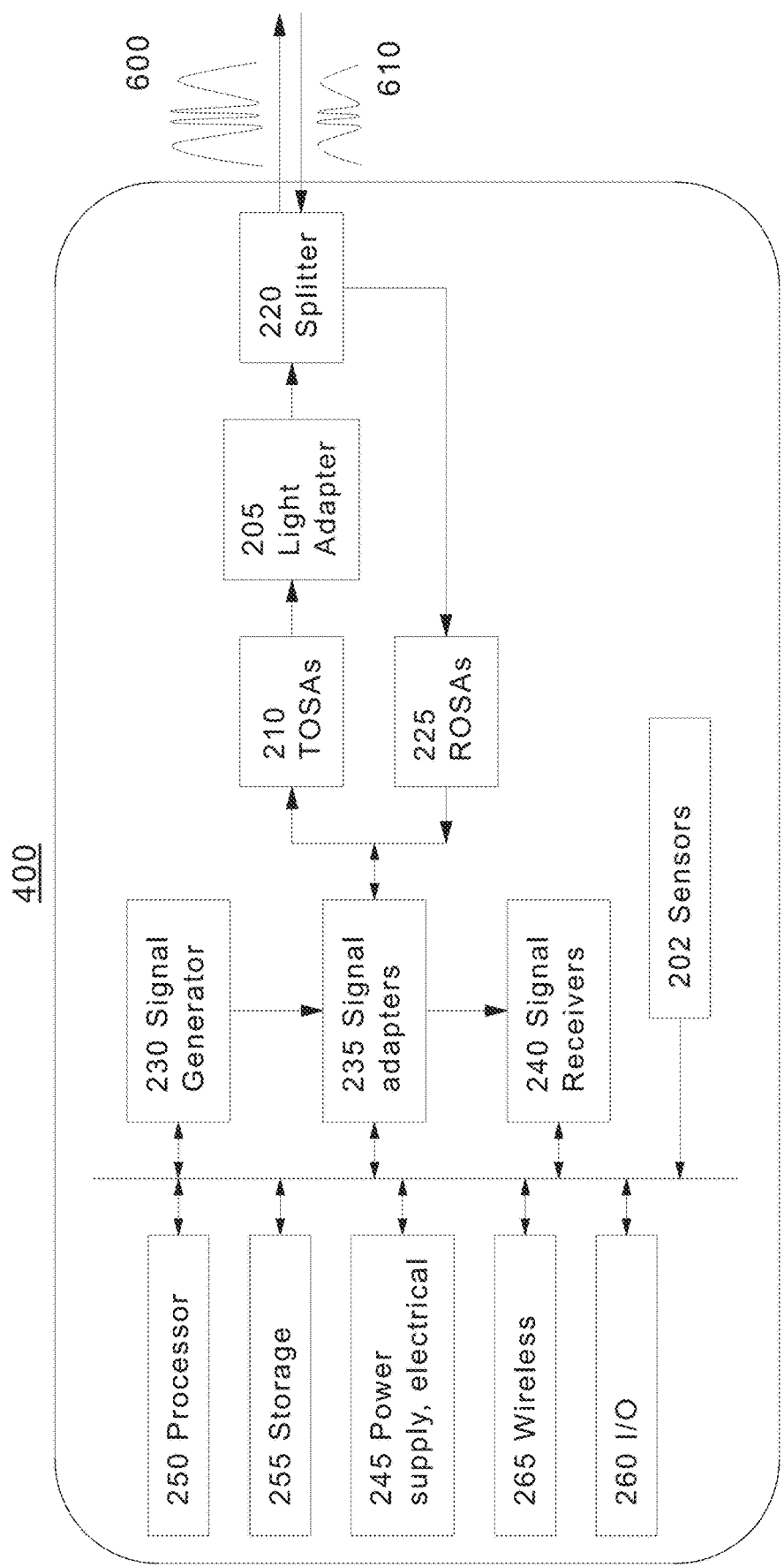
FIG. 8 shows embodiment 4.

Embodiment 4, 500, shown in FIG. 8, shares most of the components described in embodiment 3. However, they have additional components to improve the accuracy of the measurements. While, embodiments 1, 2, and 3 use reference waveforms stored in memory to de-embed the effect of the laser bandwidth from the channel under test at a temperature measured by sensor 202, embodiments 4 uses a real-time reference. Using a real-time reference provides resilience to variations of laser parameters such as center wavelength, spectral width, mode content, noise among other laser dependencies on current, temperature, and lifetime of the laser.

To provide a real-time reference, an additional splitter 215, is placed between the TOSAs 210, and light adapter 205 to direct a small portion of the transmitted light to additional ROSA 222. Alternatively, the splitter, 215, directs a small portion of the transmitted light from the TOSAs, 210, to a reference fiber, 223, which connects to ROSA 222. The reference fiber 223, is a high EMB fiber used to de-embed chromatic effects from the measurement.

Operational Examples

After a unit is turned on, a self-diagnostic test can be executed to evaluate if the unit is compliant with internal requirements, e.g., battery charge, and operational temperature among others. If the unit passes the self-diagnostic test, it allows the user to select the application of interest to evaluate the link performance, e.g., 100GBASE-SR4, 100SWDM-4, 400GBASE-SR8, 400GBASE-SR4.2, etc. Alternatively, the user can enter specific requirements, e.g., maximum supported data rate, maximum insertion losses, and maximum pre-FEC bit error rate (BER) by using the I/O interface of the unit 260, or using buttons, a USB port, a wireless interface 265, and/or a mobile device or computer.

The transmitting unit selects and sends the waveforms for channel loss testing, e.g., a series of low-frequency repetitive patterns. The remote unit 201 or 301, receives the signal and utilizes the algorithms 1200 shown in FIG. 3 to determine optical power loss. If the losses are acceptable for high-speed signal transmission, the remote unit sends a control signal to the transmitting unit, 200 or 300, indicating that it is ready to start the bandwidth measurements. If the transmitting unit 200 or 300, receives the acknowledgment from the remote unit 201 or 301, in a specified time interval, it transmits the selected waveforms. The remote unit 200 or 301, receives the signal and remove's the noise by running multiple averages, and proceeds to execute the algorithms for measuring modal bandwidth, 800. Alternatively, the remote unit offloads the DSP tasks to a computer or mobile device running a companion program. The advantage of embodiment 2 relative to embodiment 1 is that both local and remote units can simultaneously measure different fibers from opposite sides of the channel.

For embodiments 400 and 500, the user connects the main unit and reflector 410 to the beginning and end of the channel under test, as shown in FIG. 3. The main unit 400 or 500, selects and sends the waveforms for channel loss test, e.g., a series of low-frequency repetitive patterns. The waveforms are reflected by 410 and received by TOSA 225, of the main unit, 400 or 500. The processing section of the main unit, 400 or 500, removes signal noise using digital filters and executes the algorithms for measuring modal bandwidth, 800. Alternatively, the main unit, 400 or 500, can offload the DSP operation to a computer or mobile device running a companion program.

For embodiments 1 and 2, the modal bandwidth value (or values for multiple lanes), are transmitted from the remote unit 201 or 301 to the main unit 200 or 300, computer or mobile device, using wireless connectivity, USB ports, or in some cases the same link under test. Alternatively, a patch cord 605 can be used in place of remote units. In this configuration, the main unit measures the round-trip bandwidth of the duplex fiber pair.

In the local unit, 200, 300, 400 or 500, a set of algorithms are executed 900 to estimate the worst-case performance of the link. These algorithms, described elsewhere in this document, assume worst-case transceiver parameters that pass the specifications of the selected applications. The results for the selected applications, are presented to the user on the main unit display 260, or by other I/O means including to a user's computer or mobile device.

Description of Algorithms

The functionalities provided by the disclosed embodiments comprise a set of algorithms described below.

Bandwidth Estimation Algorithms, 800

Figure 9:
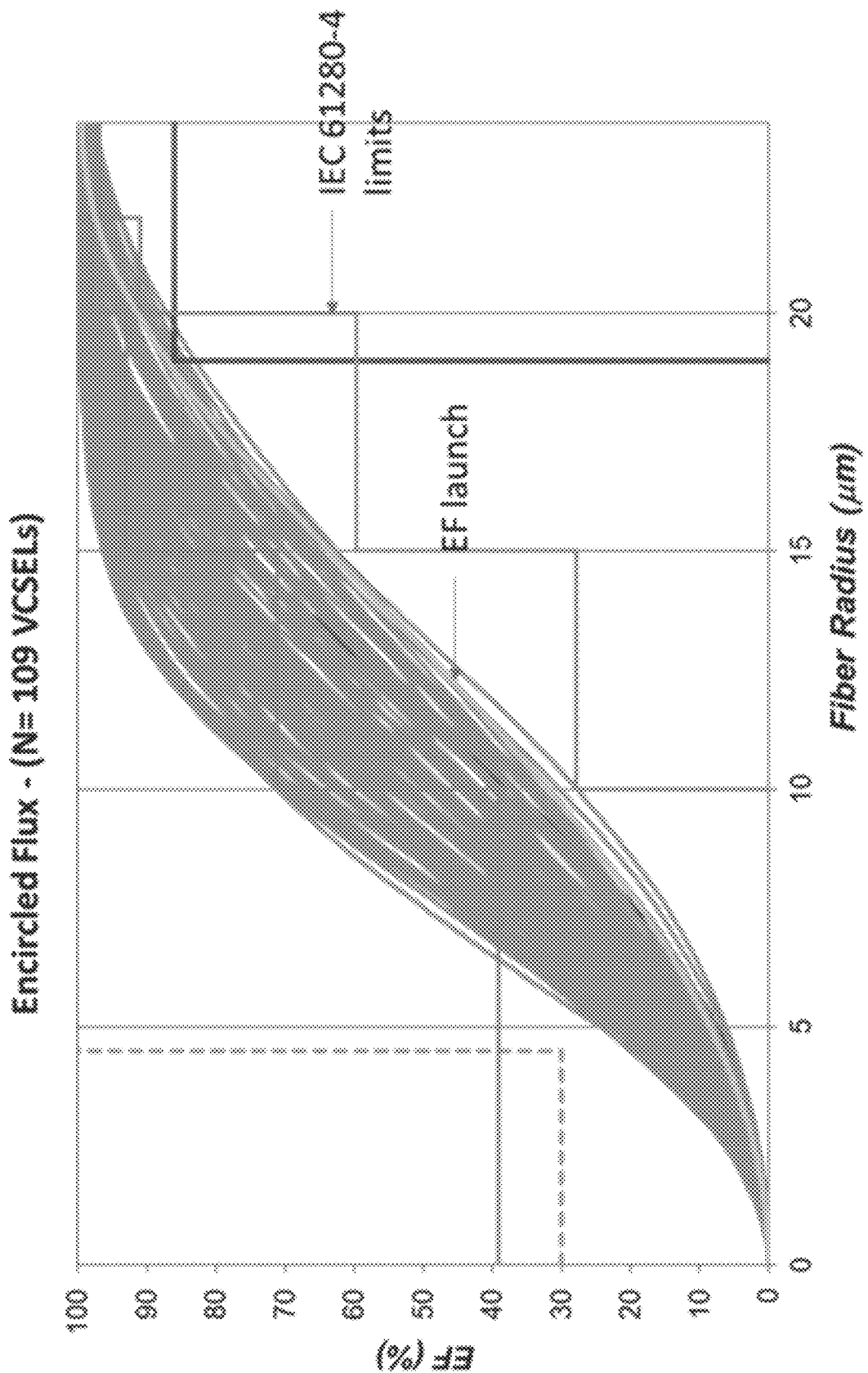
FIG. 9 is a chart showing encircled flux relative to fiber radius.

In the present invention we utilize algorithms to estimate a more accurate worst-case channel bandwidth, referred to as EF-MB. EF-MB is a metric developed by the inventors that consist in sending light that produce a mode power distribution (MPD) in the fiber that meet encircle flux requirements defined in IEC standards. Experimental measurements of MPD from hundreds of VCSELs performed for the development of this application indicates that most of the VCSELs running 10 Gbps or higher data rates have underfilling MPD compared with center values of IEC limits as shown in FIG. 9.

EF-MB correlates better to the actual channel performance bandwidth, than the industry standards specified EMB. In these algorithms, we take into account the VCSEL spectral modes and the effect of the spatial spectral coupling of VCSEL modes to fiber modes, which introduces a chromatic dispersion effect on the total channel bandwidth.

The measurement of EF-MB requires the use of a light adaptor 205, which consist of a mode mixer and filter. The light adaptor mixes the VC SEL modes eliminating the spatial spectral pattern emitted by the VCSEL. Experiments using hundreds of VCSEL-MMF channel combinations with and without light adapter 205, shows the light adapter significantly reduces the uncertainty of the estimation of modal-chromatic bandwidth, yielding a more accurate modal bandwidth measurement. In some cases, a variation on the order of 100% was observed without the light adapter. Hence, the accuracy can be reduced more than an order of magnitude by using the light adapter.

Although light adapter 205, minimize or eliminate the effect of launch condition and minimize the effect of spatial spectral bias, the spectral width, center wavelength, and non-linearities effects in the spectrum are still present. The algorithms, 800, shown in FIG. 10, minimize these effects on the estimation of EF-MB.

Figure 10:
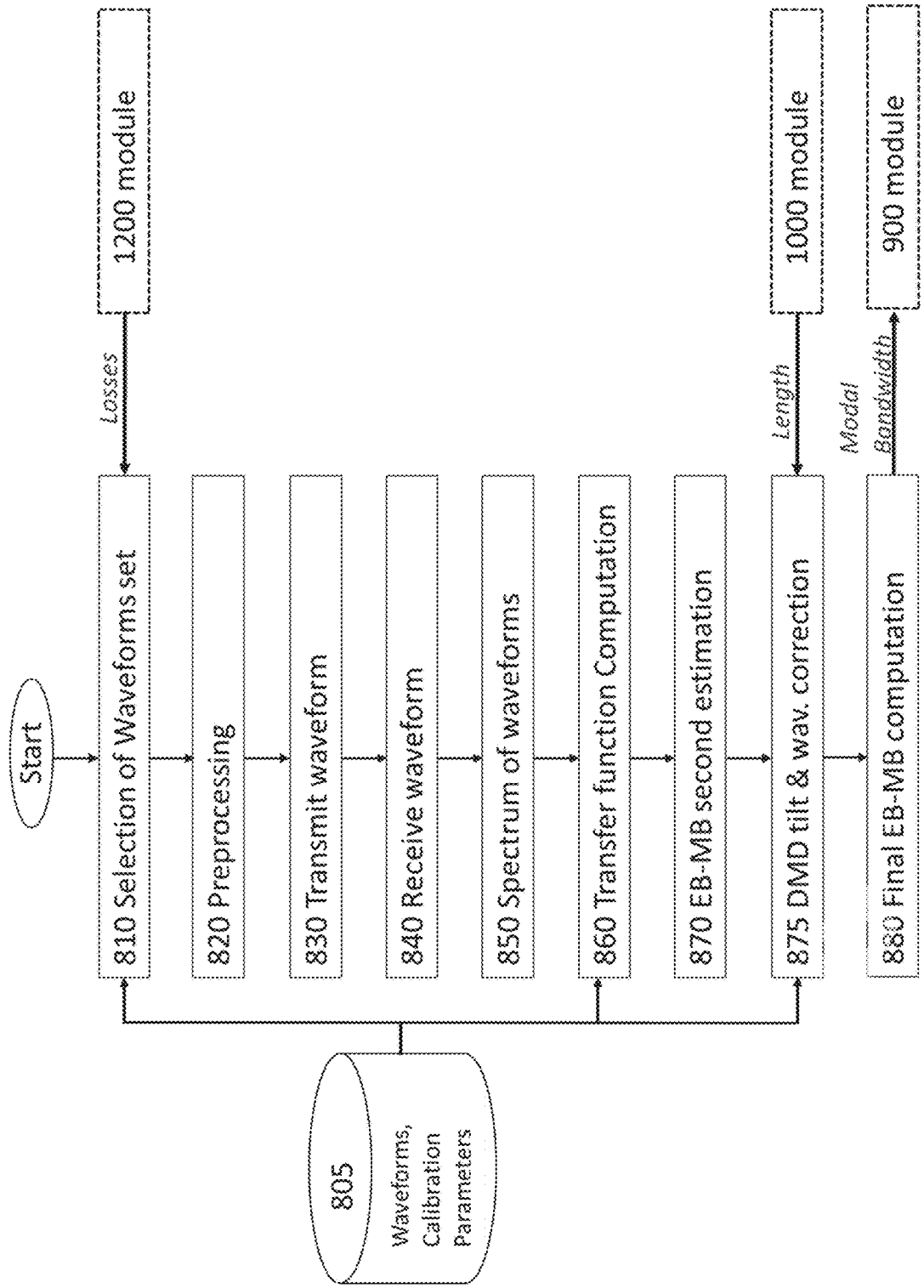
FIG. 10 shows an algorithm used to minimize certain effects on encircle-flux modal bandwidth (EF-MB).

Referring to FIG. 10, the algorithms start with the selection of a waveform set, 810, from the resident memory. The selection depends on several factors such as the optical output power of the onboard test VCSEL, and the losses of the channel. The VCSEL information of each unit is already resident in memory, 255. This information was obtained during factory testing and calibration.

The fiber channel losses are provided by the algorithms in step 1200 shown in FIG. 3. The selection of waveforms impacts the processing time, the computational requirements, and the accuracy of the test. For example, for low SNR, repetitions of a sinusoidal signal at specific frequencies, e.g., 32 repetitions of sine waves at frequencies from 1 GHz to 32 GHz in steps of 1 GHz. In other cases, based on the above criteria, a pseudo-random binary sequences (PRBS), e.g., PRBS $2^9-1$ can be used reducing the number of transmissions and testing time. Alternatively, when the SNR is high, a chirped waveform with a broad range of frequencies can be sent reducing the testing time significantly. For embodiments, 200, 300 and 400, the selected waveforms have a companion set of reference waveforms, obtained during calibration and storage in memory. For embodiments, 500, the reference waveforms are obtained almost simultaneously in real-time or with very short delays. These embodiments use splitter 215 and TOSA 222, to obtain the reference waveforms.

The signal preprocessing step 820, provides pre-emphasis to compensate for rise-time limitations of the laser and response of the photodetectors. This operation can also be performed by the signal adapter module 235, analog filters, or by the processor 250, performing as a digital signal processor (DSP). The waveforms are transmitted after selection, 830.

Figure 11:
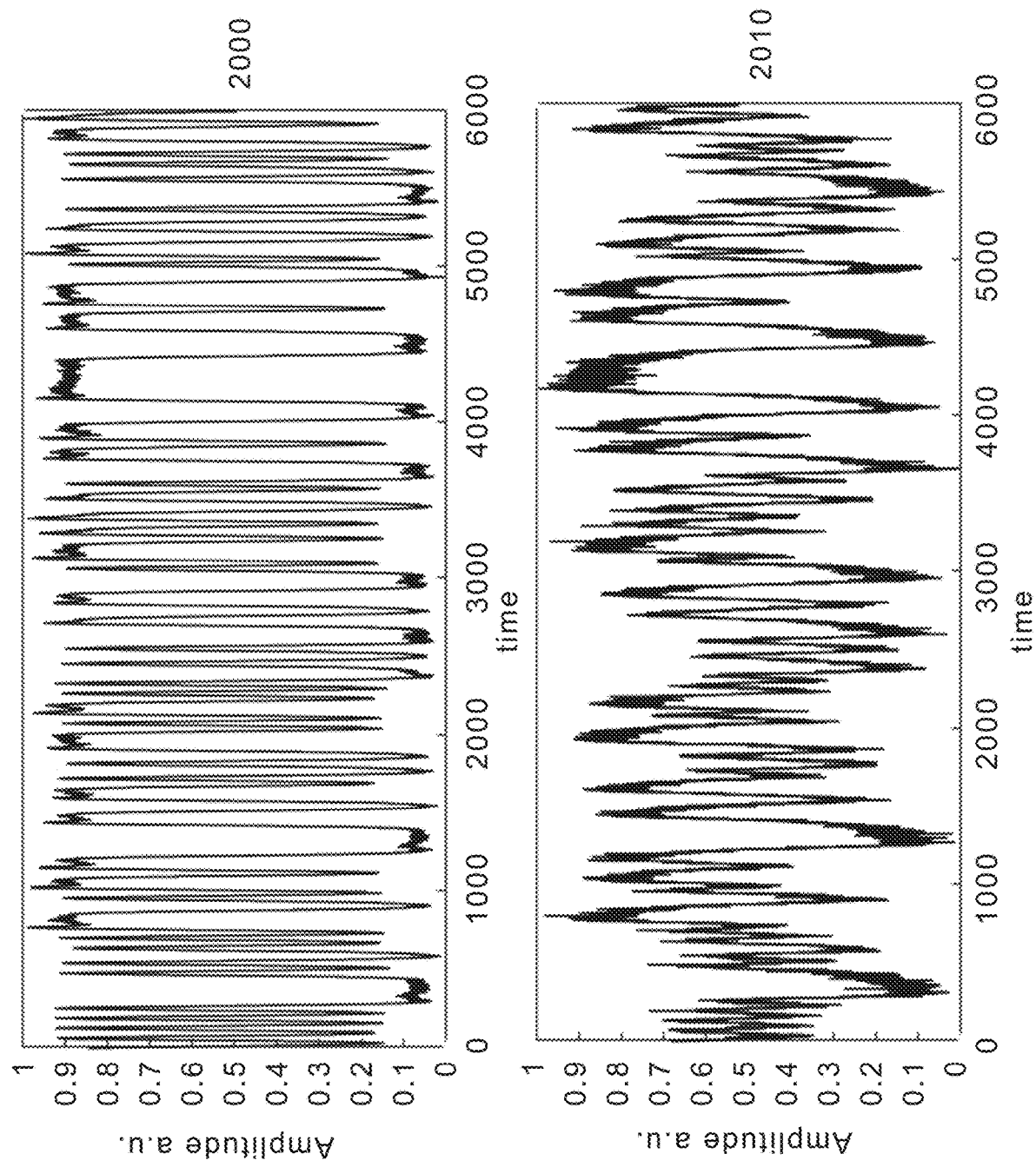
FIG. 11 shows an example of a transmitted reference waveform.
Figure 12:
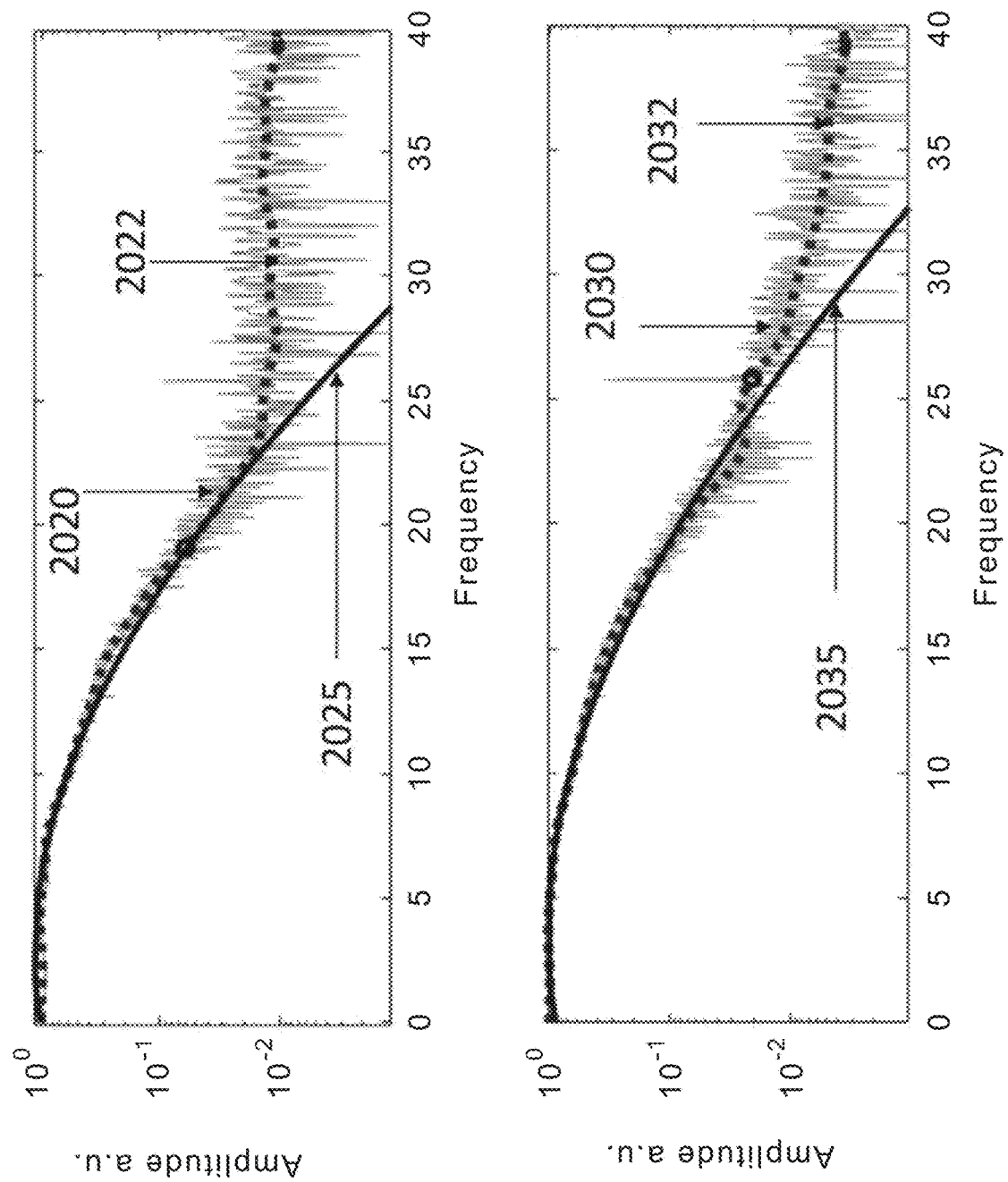
FIG. 12 shows the Fourier transform of several repetitions of the received waveforms.

FIG. 11, shows an example of a transmitted waveform 2000, which is used as a reference waveform. After propagation through the fiber under test, the waveform is received by a remote unit 201, 301, 401, or 501 for embodiments 1-4 respectively. FIG. 10 also shows an example of a received waveform 2010 after propagating through a 400-meter optical multimode channel. The received waveforms are processed in step 850. In FIG. 12, we show the Fourier transform of several repetitions of the received waveforms 2020, which are averaged in the time and frequency domains to improve the SNR. The transfer function in step 860 is computed by dividing the Fourier transform of the reference and received waveforms shown in previous figure.

The Fourier transform of the transmitted waveform 2020, and the received waveform 2030, after 40 averages is shown in FIG. 12 (gray traces). A smooth (low-pass filtered) version of the reference spectrum $S_{ref}(f)$, 2020 and received averaged waveform, $S_{Measured}(f)$, 2030 are shown as dotted lines 2022 and 2032 respectively. For embodiments, 200, 300 and 400, $S_{ref}(f)$, 2020 are retrieved from resident memory based on the temperature measured by sensor 202. For these embodiments, the waveforms are measured during the factory calibration process for a given set of temperatures as illustrated in the calibration process 1500.

Depending on the length or SNR of the signals, further filtering or curve fitting is performed. For example, a polynomial fitting of the logarithm of $S_{measured}(f)$ is performed to produce a complex polynomial representation of the spectrum of the measured and transmitted signal given by, $$S_{fitted}^{measured}(f) = \Sigma a_i^{measured} f^{b_i^{measured}} = \log(S_{Measured}(f)).$$

where, the coefficients $a_i$, and $b_i$ can be real or complex.

An equivalent fitting can be performed for the reference signal as shown in FIG. 12, where the results of this fitting process are shown using solid black traces 2025 for the reference, and 2035 for the received waveforms. The complex polynomial fitting enables the extrapolation of the transfer functions beyond the noise floor, which is needed in some cases where the length is too short, or the bandwidth channel is very high. In the example shown in FIG. 12 this happens around 20 GHz.

The transfer function computation step, 860, obtains the modal and chromatic transfer function of the channel as shown, $$H_{M-Ch}(f) = \exp\left(\sum_i a_i^{measured} f^{b_i^{measured}} - \sum_i a_i^{Ch} f^{b_i^{Ch}}\right)$$

Figure 13:
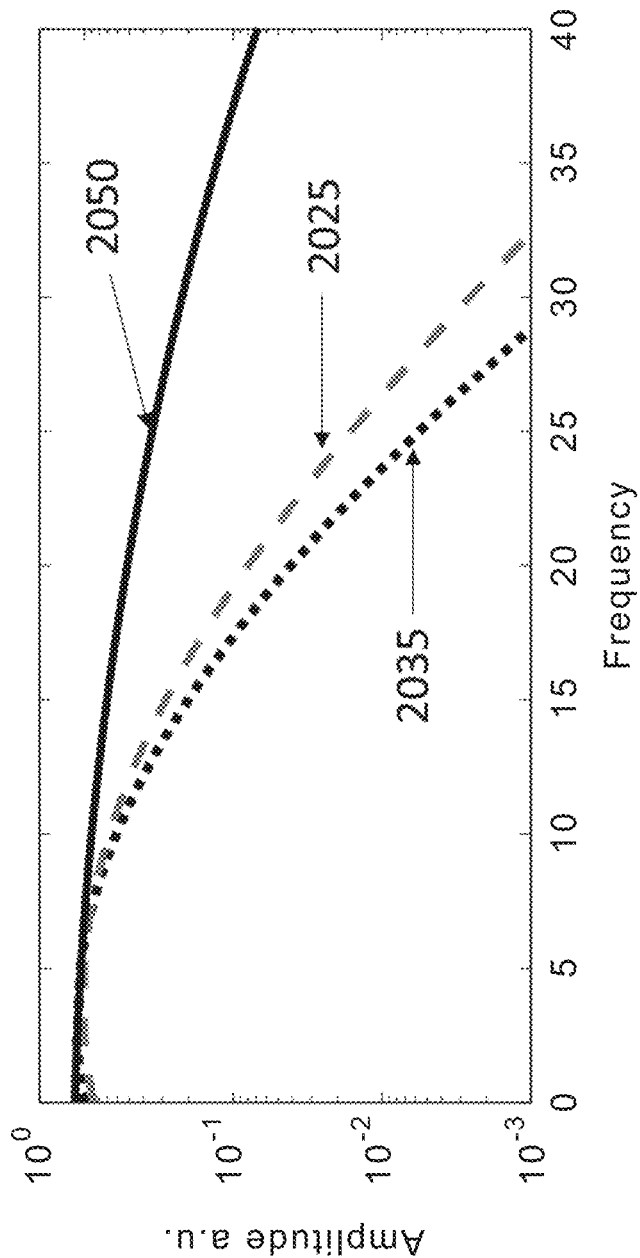
FIG. 13 shows the modal chromatic transfer function.

In cases where the SNR is high, the transfer function can be computed directly from the measured averaged reference and measured spectrum. FIG. 13 shows the modal chromatic transfer function, 2050, obtained from the above equation for the DUT signal.

Initial values for the 3 dB modal-chromatic bandwidth are also estimated in step 860. The initial value assumes that the VCSEL behaves as a LTI system and computes the initial estimator for 3 dB modal chromatic bandwidth, solving $F0_{M-Ch}$, from the equation, $H_{M-Ch}(F0_{M-Ch})=0.5$. This is equivalent to solving, $$\Sigma_i a_i^{measured}(F0_{M-Ch})^{b_i^{measured}} = \log(0.5),$$

when polynomial fitting is used.

The chromatic dispersion effects on bandwidth caused by the VCSEL spectrum and fiber dispersion parameters are removed in step 860 by dividing the modal chromatic transfer function by the calibration VCSEL chromatic transfer function, $H_{Ch}(f)$, as shown below.

$$H_M(f) = H_{M-Ch}(f)/H_{Ch}(f) = \exp\left(\sum_i a_i^{measured} f^{b_i^{measured}} - \sum_i a_i^{Ch} f^{b_i^{Ch}}\right)$$

The calibrated function $H_{Ch}(f)$ is retrieved from a set of calibration functions stored in memory, 255, based on the temperature measured by sensor 202. The set of calibrated functions $H_{Ch}(f)$ are obtained during the factory calibration process 1500.

Figure 14:
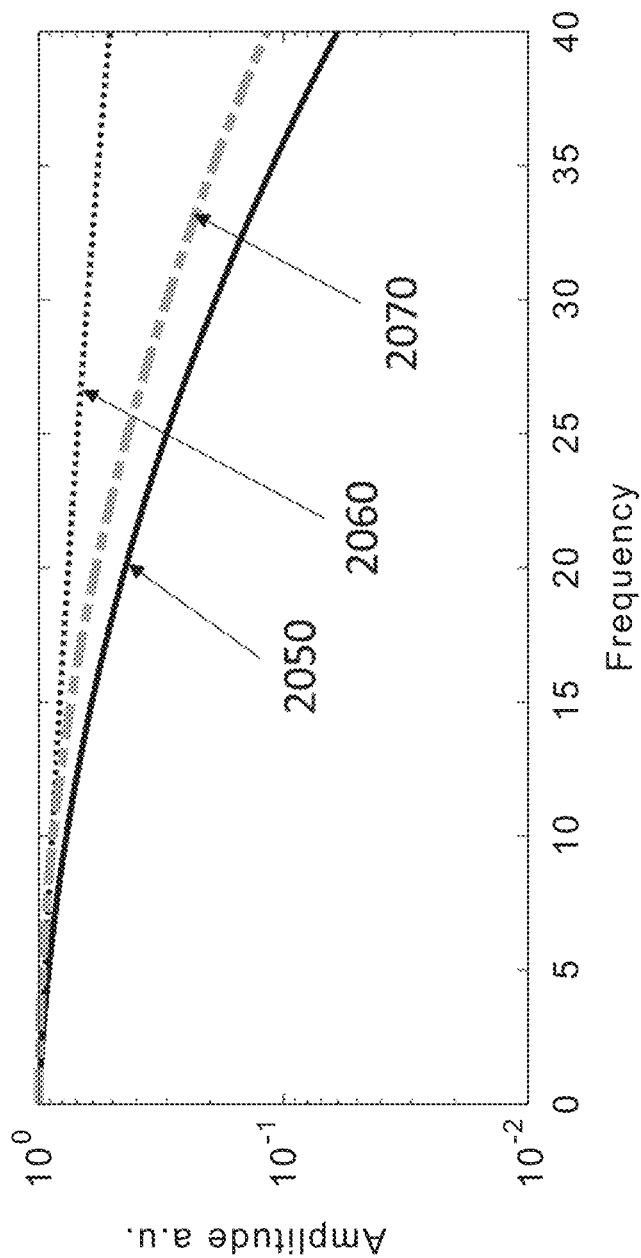
FIG. 14 shows the computation for the VCSEL utilized in the example shown in FIGS. 11 to 12.

FIG. 14 shows this computation for the VCSEL utilized in the example shown in FIGS. 11 to 12. In these figures, the modal transfer function, 2070 is obtained by dividing the modal-chromatic transfer function, 2050 by the calibrated chromatic transfer function, 2060.

The initial estimator for 3 dB modal bandwidth is obtained by solving $F0_M$, from the equation, $H_M(F0_M)=0.5$. This is equivalent of solving, $$\Sigma_i a_i^{measured}(F0_M)^{b_i^{measured}} - \Sigma_i a_i^{Ch}(F0_M)^{b_i^{Ch}} = \log(0.5),$$

when the polynomial fitting is used.

Due to the NLTI, the center wavelength and other impairments of the VCSEL, $F0_M$ is an unreliable estimator for EF-MB and therefore used only during the selection and calibration step of VCSELs, 1500.

In step 870 a better estimation of the EF-MB, utilizing statistical data for the VCSEL population variation is given by, $$F1_M = F1_{M-Ch} + K(F1_M)(F_{Ch-max} - F_{ch})$$

where, $F1_M$ is the 3 dB EF-MB, $F1_{M-Ch} = \min(F0_{M-Ch}(1+k_{cal-ch}), F_{Ch})$, $k_{cal-ch}$ is a factor, related with the error tolerance during calibration, $F_{Ch}$ is the 3 dB chromatic bandwidth obtained from $H_{Ch}(f)$ during the calibration process 1500, $F_{Ch\text{-}max}$ is the maximum 3 dB chromatic bandwidth from the population of VCSEL during calibration, and $K(F1_M)$ is a calibration function.

The relationship between EF-MB and modal chromatic bandwidth shown in the previous equation uses a calibration function that depends on an unknown modal bandwidth, $F1_M$. Therefore, solving this equation requires demanding computation and time that can exceed the apparatus capacity and test requirements.

Figure 15:
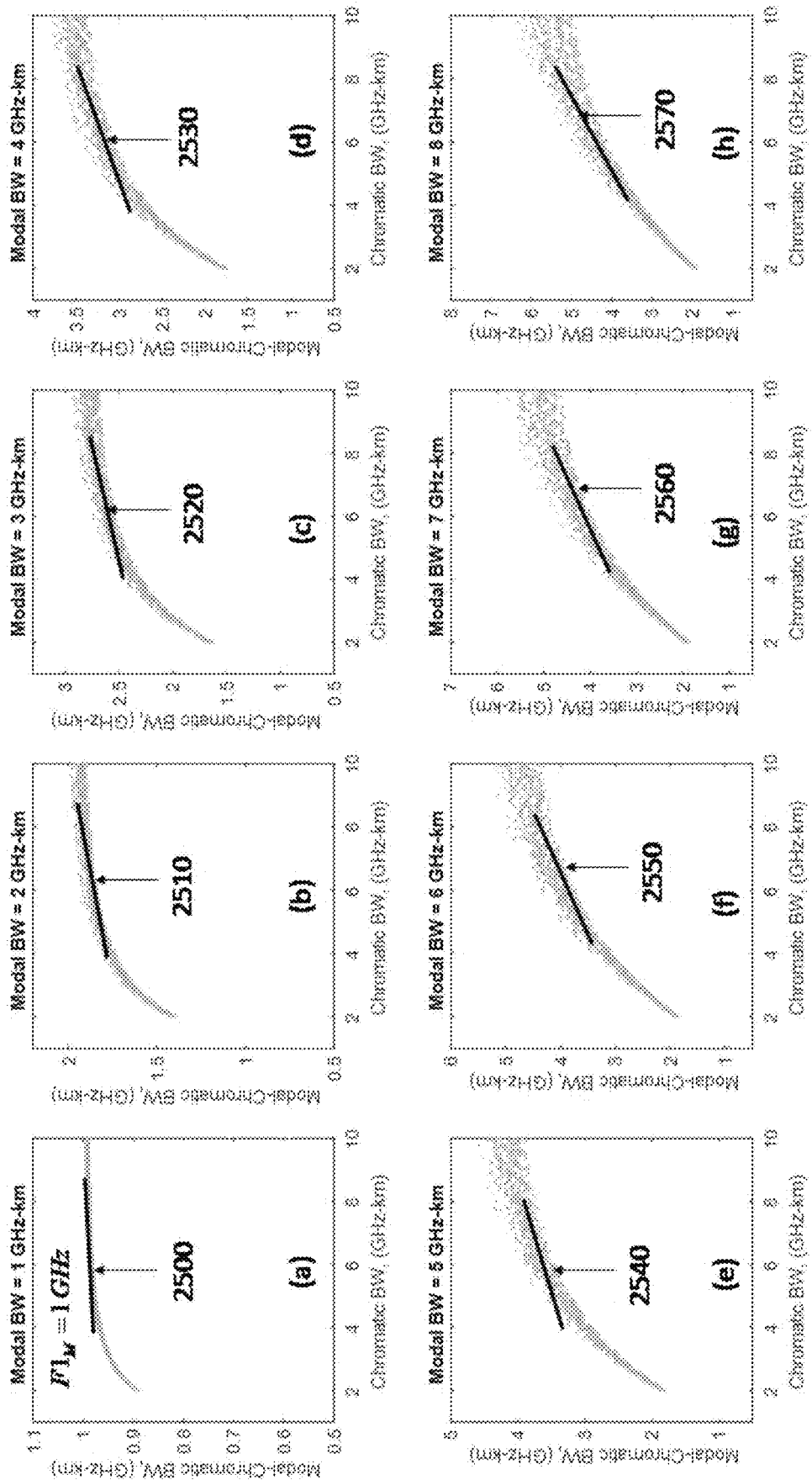
FIG. 15 shows the modal bandwidth for eight fibers, labeled a-h.

To overcome this problem, simulations using the model described above indicates that despite the noise or NLTI response of the VCSELs, a linear correction can be implemented for a selected population of VCSELs. For example, FIG. 15(*a-h*) shows eight figures representing eight fibers of different modal bandwidths, $F1_M$, from 1 to 8 GHz·km. In each figure, the relationship between modal chromatic bandwidth $F0_{M\text{-}Ch}$ and chromatic bandwidth $F_{Ch}$ for 120 simulated VCSELs is shown (gray dots in each figure). FIGS. 15(*a-c*) indicate that for low, $F1_M$ and $F_{Ch} \geq 4$ GHz·km, the effect of the VCSEL $F_{Ch}$ on uncertainty is lower than expected since in this regime most of the bandwidth limitation is due to modal dispersion. The uncertainty increases with $F1_M$ reaching significant values for high modal bandwidth and high chromatic bandwidth as shown in FIG. 15 (*e-h*) for $F_{Ch} \leq 9$ GHz·km.

A linear fit for the range 4 GHz·km $\leq F_{Ch} <$ 9 GHz·km is shown as the black trace in FIG. 15. We observe that the fitting slope increases with $F1_M$. The increase follows approximately the linear equation shown below, $$K(F1_M) = \kappa_1 F1_M + \kappa_0$$

where the parameters $\kappa_1$ and $\kappa_0$ are estimated from modeling, $\kappa_1 = 0.08 \pm 0.01$ and $\kappa_0 = -0.082 \pm 0.01$ are verified during the calibration and selection process, method 1500.

Using this calibration function $K(F_M)$, and from previous equations the modal bandwidth $F1_m$ is obtained as, $$F1_M = \frac{F1_{M\text{-}Ch} + \kappa_0(FCh_{Ch\text{-}max} - F_{ch})}{1 - \kappa_1(FCh_{Ch\text{-}max} - F_{ch})}$$

where $F_{Ch\text{-}max}$ is the maximum chromatic bandwidth of the populatin used for calibration.

In step 875, the effect of the center wavelength of the VCSEL on bandwidth estimation is removed. The apparatus disclosed here uses VCSELs specified with a wavelength tolerance equal to or better than the one specified in TIA Standards for DMD/EMB measurements [1], e.g. 850±10 nm.

Figure 16:
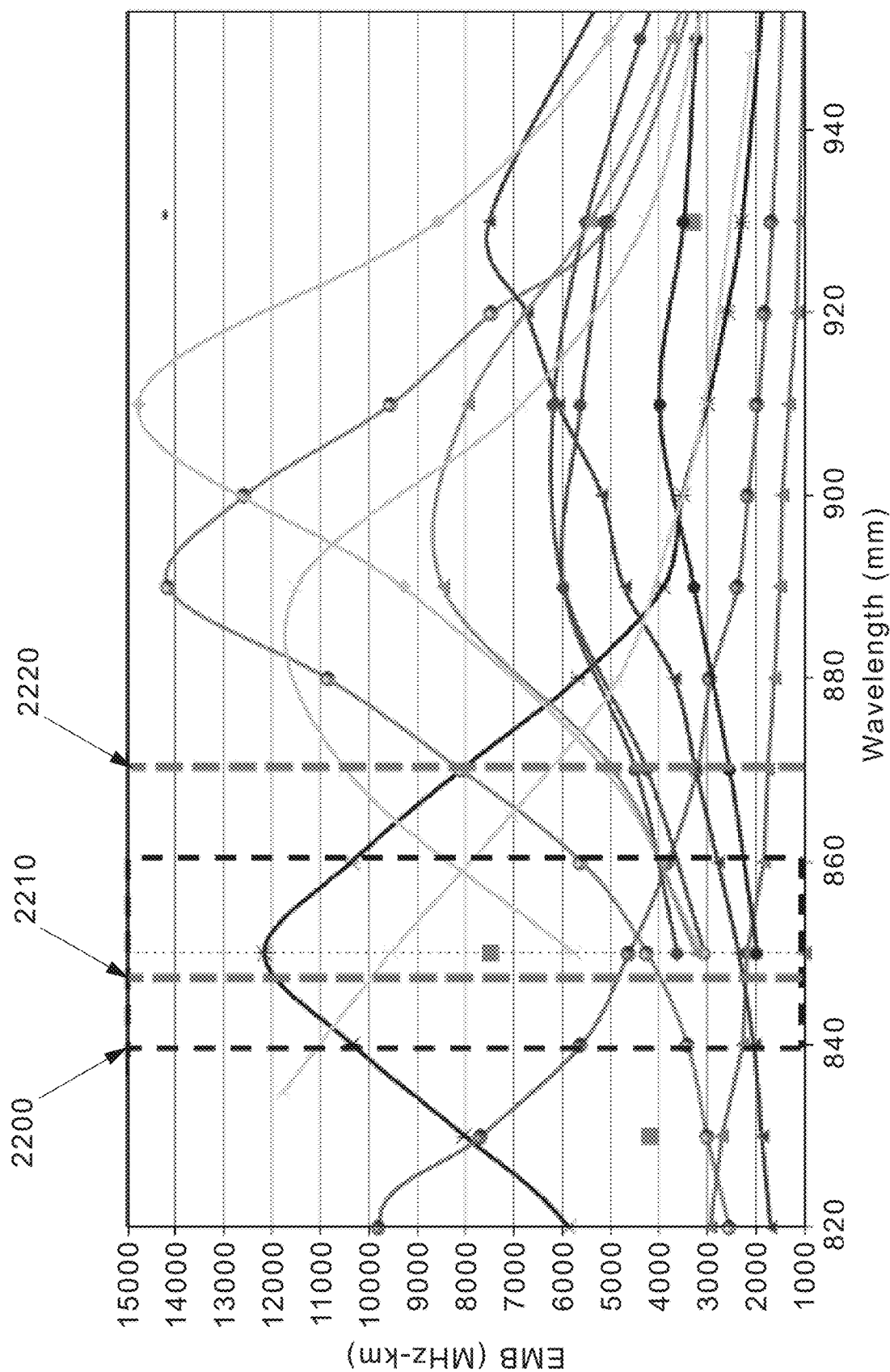
FIG. 16 shows The effect of DMD tilt on the estimation of modal bandwidth.

The effect of DMD tilt on the estimation of modal bandwidth is significant even when the wavelength variation is inside the range of tolerances defined by DMD standards [1] as shown in FIG. 16. For example, for the spectral of 850 nm, box 2200, the figure, variations of 20% can be produced.

The modal bandwidth dependence on wavelength is related to the tilt of the DMD radial pulse waveforms at 850 nm. The DMD pulses measured at different radial offsets across the core of a MMF can tilt to the left (L-MMF) of right (R-MMF). For L-MMF higher-order modes of the MMF arrive faster than lower-order modes [3]. For R-MMF the opposite occurs [3]. Ideally, the refractive index of MMFs is designed to produce fibers with zero or minimum tilt in the 850 nm spectral region. However, during the preform fabrication variations of the designed refractive index profile L-MMF, R-MMF or fibers with noisy tilts are produced.

The information of the tilt helps to determine the behavior of the fiber modal dispersion and modal bandwidth as the wavelength change. To summarize the work presented in [5], by the inventors L-MMF modal bandwidth increases with wavelength, and R-MMF decreases with wavelength.

Here we disclose two methods to correct for center wavelength. The first method uses two or more lasers in TOSAs 210, and two or more receivers in ROSAs 222 and 225. Two lasers are enough to determine the rate of change of modal bandwidth.

For example, in FIG. 16 we plot the EMB wavelength dependence for 12 multimode fibers, and show the center wavelengths of two selected VCSELs used in the device as vertical traces, 2210 and 2220. Tables or functions describing that dependency can be obtained during the calibration procedure, 1500. Therefore, using two or more VCSELs can be used to estimate the bandwidth of the fiber for the complete range of wavelength from 800 nm to 1000 nm.

Figure 17:
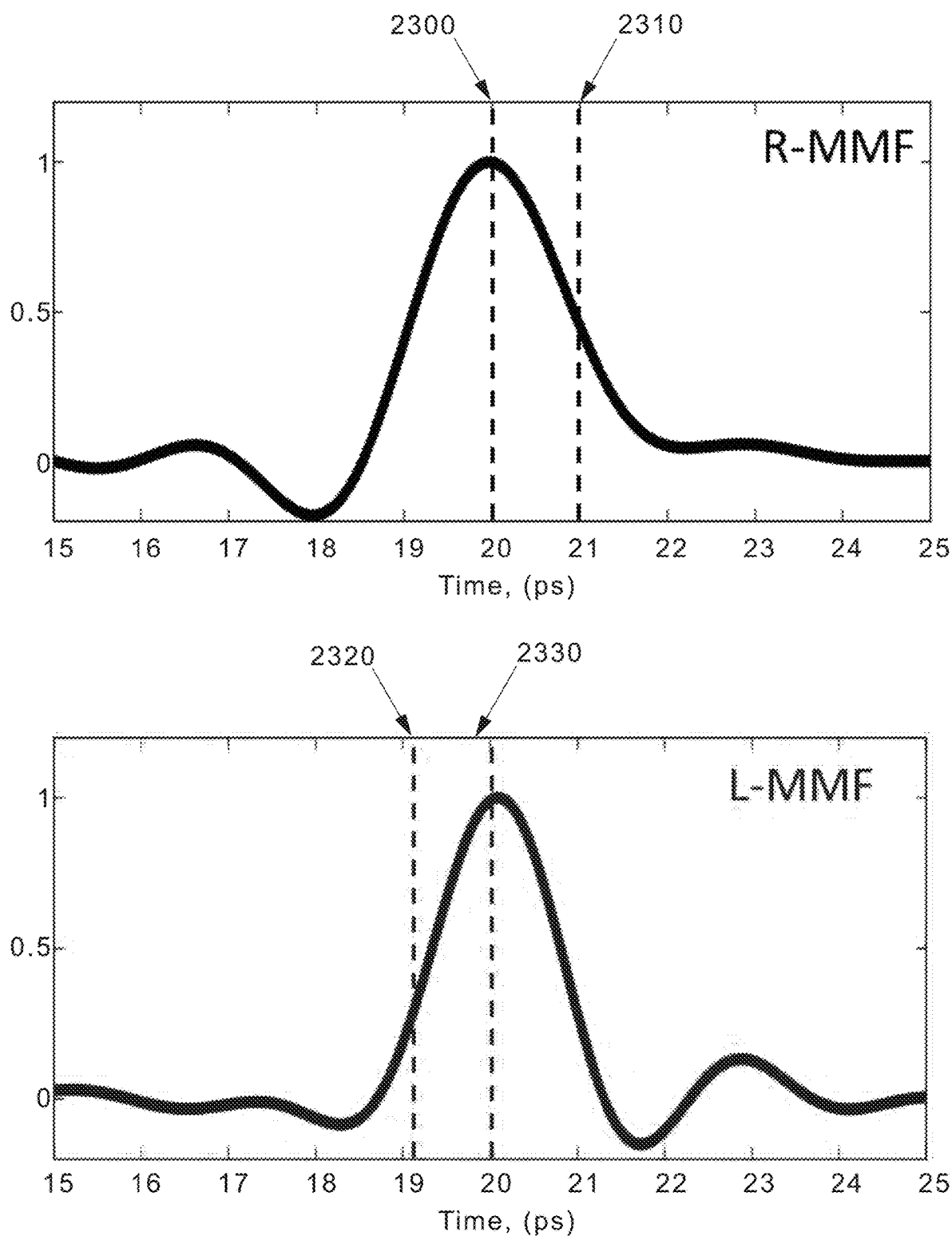
FIG. 17 shows how compliant EF launches tend to have slower exponential decay towards the direction of the tilt.

In addition to the previous method, the inventors are disclosing a method to correct the effect of center wavelength using only one VCSEL (one wavelength). The inventors discovered that statistically, for MMFs, the impulse responses or partial reconstructions of them, given a compliant EF launch tend to have slower exponential decay towards the direction of the tilt as shown in FIG. 17 for R-MMF and L-MMF of similar EMB. This partial reconstruction of the impulse response, $IR(t)$, can be obtained from the transfer functions, $H_M(f)$ or $H_{M\text{-}ch}(f)$ by, $$IR(t) = \text{ifft}(|H_{M\text{-}Ch}(f)|^{\varepsilon_1} \exp(2\pi j \varepsilon_2 \text{phase}(H_{M\text{-}ch}(f)))$$

Where $\varepsilon_1$ and $\varepsilon_2$ are parameters that exacerbate the impact on the DMD tilt to improve its detection on the temporal domain. Although, those parameters are dependent on the hardware implementation in most of the cases, $\varepsilon_1 \leq 1$ and $1 \leq \varepsilon_2 \leq 4$.

The temporal position of the peak value, $\tau_{peak}$, and the centroid, $\tau_{centroid}$ of $IR(t)$ are computed. The sign of $\tau_{centroid} - \tau_{peak}$ is used to estimate the sign of the DMD tilt. If $\tau_{centroid} - \tau_{peak} < \tau_{th}$ is assumed L-MMF. If $\tau_{centroid} - \tau_{peak} > \tau_{th}$ it is assumed R-MMF. The threshold parameter $\tau_{th}$, ideally zero for a system free of noise, is used to compensate for bandwidth and noise limitations due to the system and reconstruction method. For the examples, in FIG. 17, $\tau_{peak}$ for R-MMF and L-MMF are represented by 2300 and 2330 respectively. The centroids, $\tau_{centroid}$ for R-MMF and L-MMF, are represented by 2310 and 2320 respectively. This figure illustrates that $\tau_{centroid} - \tau_{peak} > 0$ for R-MMF whereas $\tau_{centroid} - \tau_{peak} < 0$ for L-MMF In step 880, the information of the direction of the DMD tilt and the center wavelength of the VCSEL from calibration, is possible to introduce an additional correction factor for the modal bandwidth that takes into account the VCSEL wavelength offset. The new estimation of modal bandwidth, $F2_M$, is given by, $$F2_M = F1_M[1 + \rho(F1_M, \tau_{centroid}, \tau_{peak})[\lambda_{VCSEL} - \lambda_0]],$$

where, $\lambda_{VCSEL}$ is the center wavelength of the VCSEL, $\lambda_0$ is the nominal wavelength of the spectral region of the test, e.g., 850 nm, and $\rho(F1_M, \tau_{centroid}, \tau_{peak})$ is the correction factor given by, $$\rho(F1_M, \tau_{centroid}, \tau_{peak}) = F1_M[1 + \kappa_3 \text{sign}(\tau_{centroid} - \tau_{peak} - \tau_{th})],$$

where, $\kappa_3 = 0.2 \pm 0.1$ depending on the implementation of the measurement system.

The obtained modal bandwidth, $F2_M$ is sent to module 900 for reach and performance computation.

Reach Estimation Algorithms, 900

Figure 18:
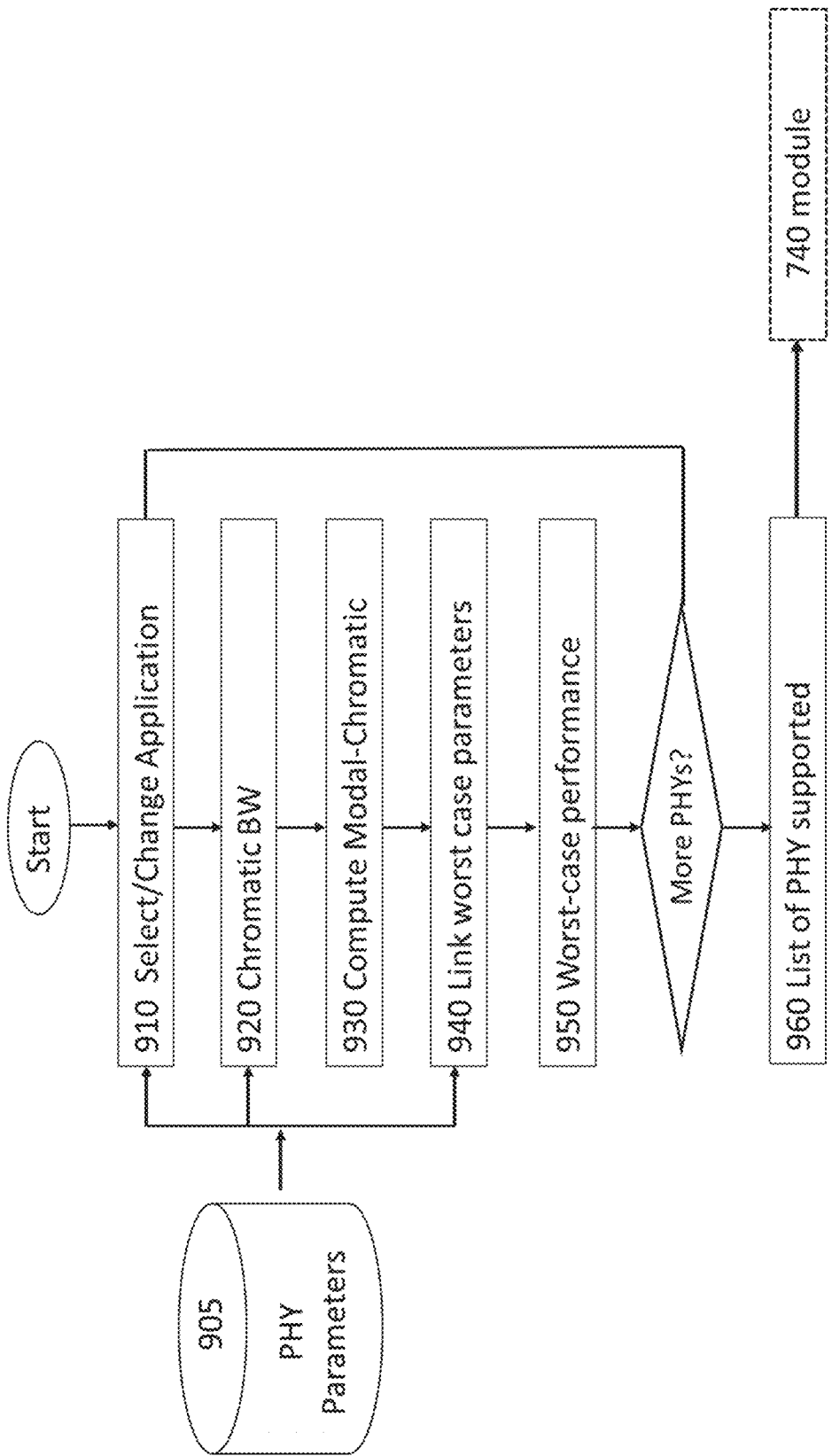
FIG. 18 shows the flow diagram for the channel reach and performance estimation method.

The flow diagram for the channel reach and performance estimation method is shown in FIG. 18. The method starts by selecting the application(s) to be evaluated, module 910. In module 920, the worst-case VCSEL spectral width for the selected application(s), e.g., $\Delta\lambda=0.6$ nm for 400GBASE-SR8, is retrieved from memory and the worst-case chromatic transfer function $H_{Ch\_wc}(f)$ is computed. The 3 dB-chromatic bandwidth, $F_{Ch\_wc}$, is determined. In industry Standards, e.g., [6,7], the worst-case transfer function is assumed Gaussian.

The modal bandwidth, $F2_M$ computed in module 800 is used to produce a Gaussian or super-Gaussian transfer function $H_{M\text{-}wc}(f)$. In 930, the worst-case modal chromatic bandwidth, $F_{M\text{-}Ch\_wc}$, for the selected application(s) is computed. In the case of the super-Gaussian fitting, both transfer functions are multiplied, and $F_{M\text{-}Ch\_wc}$ is found numerically. In the case of Gaussian fitting, $F_{M\text{-}Ch\_wc}$ can be computed analytically using, $$F_{M\text{-}Ch\_wc}=(F_{Ch\_wc}^{-2}+F2_M^{-2})^{-0.5}$$

In module 940, the parameters for the selected application, such as data rate, target BER, optical modulation amplitude (OMA), laser rise-time, receiver bandwidth among others are retrieved from resident memory. Also, the worst-case channel impairments such as jitter, RIN, MPN. RIN, baseline wander, and many others are also retrieved from memory.

In module 950, the link model is used for the selected application. Most of the IEEE 802.3 Ethernet applications for speeds up to 25 Gbps per lane, (aggregated 100 G using four lanes) have an associated link model published in IEEE Standards body meeting documentation. For Fiber Channel, link models for up to 28 Gbps per lane can be found in published meeting contributions. Recently, new models for up to 50 Gbps and 64 Gbps per lane were presented by the inventors in the IEEE 802.3 cm project [8] Link models at higher speeds, e.g., 100 Gbps per lane (aggregated 400 Gbps using 4 lanes), have also been developed by the inventors and used in this disclosure.

Figure 19A:
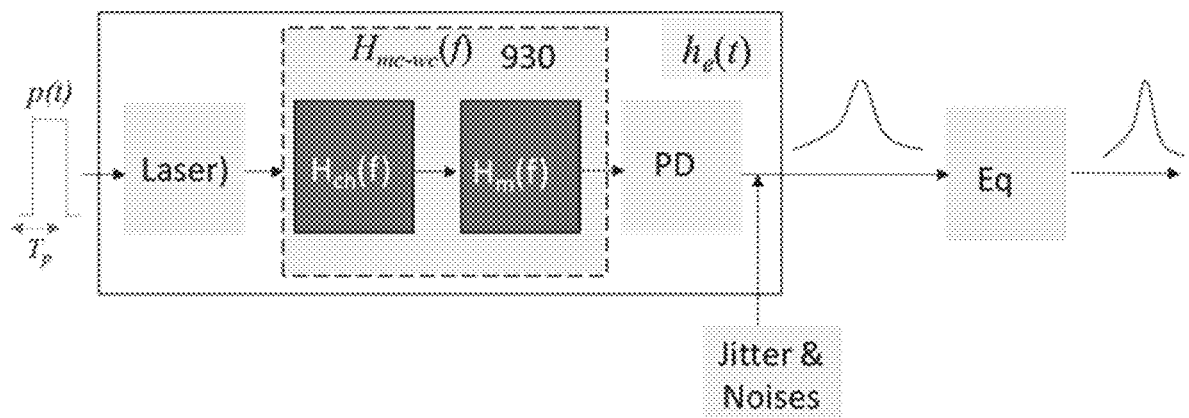
FIG. 19a shows an example of the link model for 50 Gbps per lane using pulse amplitude modulation PAM-4.
Figure 19B:
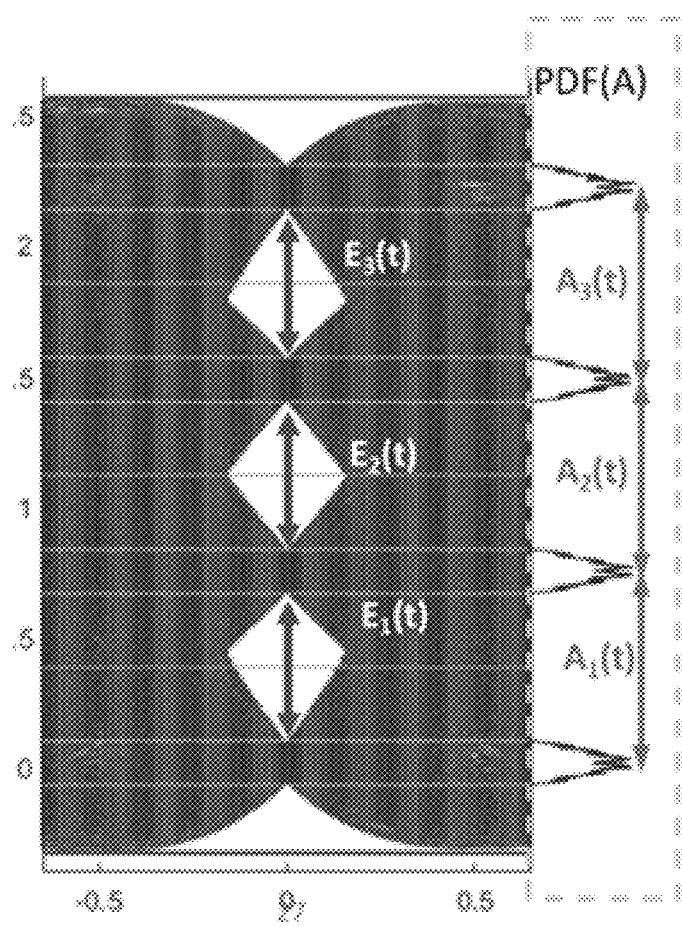
FIG. 19(b) shows the eye diagram for PAM-4 signals for the length under test.

An example of the link model for 50 Gbps per lane using pulse amplitude modulation PAM-4 is shown in FIG. 19(*a*). The complete set of equations to solve this model were disclosed elsewhere [8]. These models evaluate the performance, e.g., for BER at any given length. For example, FIG. 19(*b*) shows the eye diagram for PAM-4 signals for the length under test. If the obtained BER meet the BER or pre-FEC BER requirement for the application, a record that shows that the tested channel passes the requirements is stored. If the user selects more than one application, the algorithm is repeated until the performance of all the selected applications is estimated by module 960. After this condition is achieved, a report is prepared and the results of the test are sent to the user, step 740, FIG. 3.

Length and Reflective Events Measurements Algorithms

The length and reflective events measurement algorithms are performed in module 1000. The test instrument commonly used to characterize and certify the attenuation of an installed optical fiber channel is the OTDR. An OTDR injects a pulse of light (typically on the order of nanoseconds) into one end of the channel under test. As the pulse propagates, light is continuously reflected due to Rayleigh backscattering along the fiber, and captured using an avalanche photodetector (APD) receiver. Given the refractive index of the fiber, n, the temporal delay is converted to optical path length using, $L=\Delta T\ c/2n$, where c is the speed of light in vacuum, and the factor 2 accounts for the round trip path length of the pulse. In FIG. 20, (a) depicts the launch pulse and, (b) illustrates the OTDR output trace showing the optical attenuation with position and two reflective events (high backscattering) along the optical path.

In this disclosure, embodiments 400 and 500 utilize a high reflectivity filter, 410, at the far end of the fiber under test and therefore, an expensive APD is not required. The high speed and short pulse width TOSA, 210, and the high bandwidth of the ROSA, 225, in these embodiments enable length measurements with centimeter resolution, which is an order of magnitude better than standard OTDRs. Therefore, embodiments 400 and 500 can be used for applications that require tight equalization of the optical path lengths such as algorithm stock trading.

The preferred method, as disclosed in these embodiments, is to transmit a pulse from TOSA 210, and strongly reflect the light by a far end optical reflector 410, which is then received by ROSA 225. The delay between the reference and the received signal is measured and the length computed as described above. Alternative, a specially selected pseudo-random binary sequence can be used instead of a single pulse as shown in FIG. 20(*c*). A PRBS, has low cross-correlation, and can be used to implement a correlation OTDR, C-OTDR. The reflected signal is correlated with a reference signal and correlation peaks are found as shown in FIG. 20(*d*). The delay can be converted to optical length as described before.

IL and SNR Measurement Algorithms

Utilizing module 1200, FIG. 3, the losses of the channel can be determined by comparing the power received by the reference ROSA and channel ROSA in embodiments 400 and 500. By repeating the transmission of the waveforms N times, the losses can be computed using, $$\text{Losses} = 10\log_{10}\left(\frac{\overline{s}_{channel}}{\overline{s}_{Ref}}\right) - \text{Loss}_{correction}$$

where $\overline{s}_{Re\_f}$ and $\overline{s}_{channel}$ are the temporal average of N waveforms repetitions, $\text{Loss}_{correction}$ is a calibration factor that takes into consideration the losses of the light adapter 205, splitters 215 and 220, and difference between the photodetector responsivities.

The optical SNR or Q factor can be computed as, $$Q = 10\log_{10}\left(\frac{OMA_{channel}}{2\overline{\sigma}}\right)$$

where, $OMA_{channel}$ is the optical modulation amplitude of the received signal and $\overline{\sigma}$ the average noise standard deviation.

Calibration Measurement Algorithms

Figure 21:
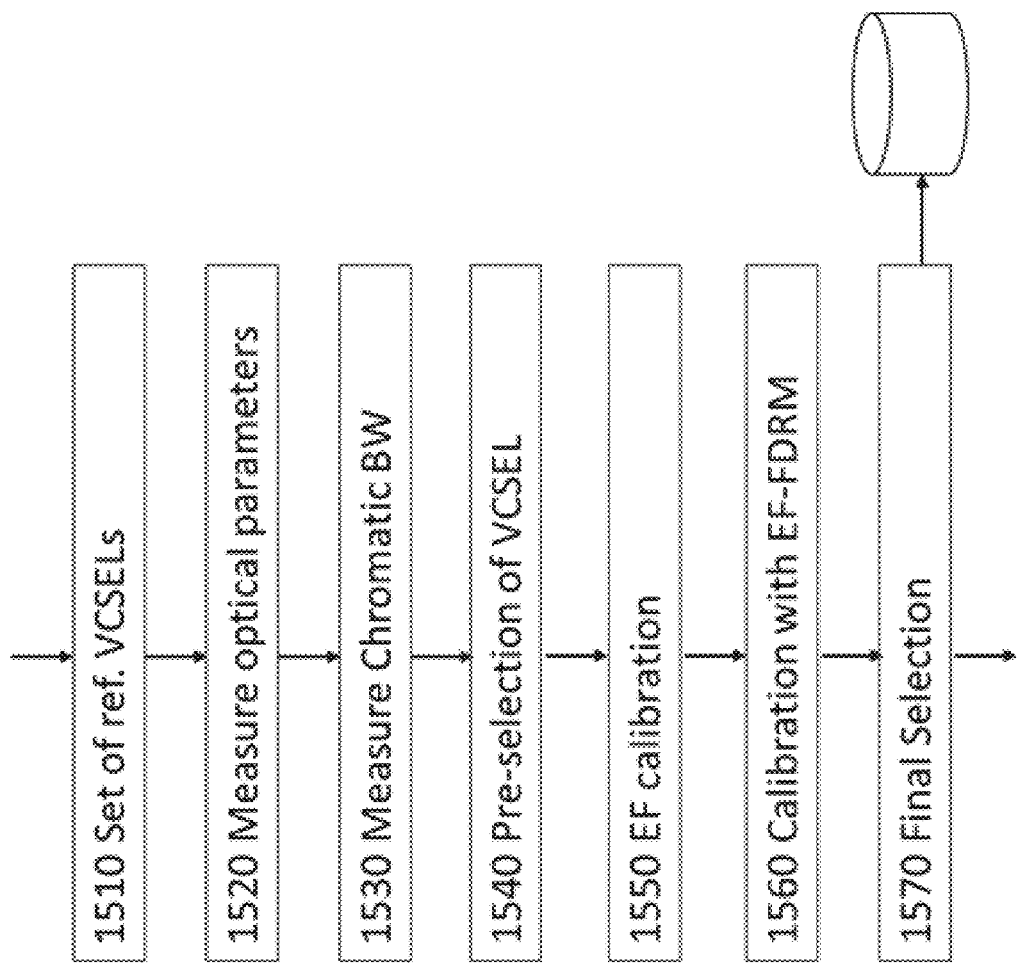
FIG. 21 shows a calibration method to perform accurate measurements using VCSELs.

The utilization of direct modulated VCSELs for channel bandwidth measurements of MMF reduces the cost and complexity of the apparatus. However, the launch condition, MSB, the NLTI response of direct modulated VCSEL, and other factors can significantly increase measurement error. The disclosed calibration method 1500, FIG. 21, is necessary to perform accurate measurements using VCSELs.

Part of the calibration method consists of controlling the launch condition to minimize MSB and variation of bandwidth due to the VCSEL. The method also includes a selection of "correctable" VCSEL to a degree of pre-determinate tolerances. In addition, it computes correction functions to be used in module 800 (FIG. 3) for accurate estimation of channel bandwidth.

The calibration requires a set of reference fibers with various values of modal dispersion, measured with a very accurate laser of narrow linewidth under encircled flux conditions. We refer to these reference fibers as encircle flux fiber reference dispersion modules, EF-FDRM. The EF-MB of the EF-FDRMs are measured with a tunable mode-locked titanium: sapphire laser with RMS pulse width on the order of 14 ps. A mode mixer and filter similar to 205, is incorporated at the output of the Ti-Sapphire laser to produce the EF compliant launch. The transfer function of each fiber and EF-MB is stored and used for calibration.

Chromatic Bandwidth: VCSEL Selection and Correction Functions

The initial VCSEL selection 1510, depends on known parameters of the VCSEL from Standards specifications for operation at speeds ≥25 Gbaud. For example, the VCSELs should have a 10-90% rise-time better than 30 ps. Also, the jitter and noise parameters, such as RIN, modal noise (MN), MPN and deterministic jitter need to meet requirements established in applications Standards such as IEEE 802.3bm, 802.3cd, 802.3cm, and Fiber Channel PI-7. For a multi-wavelength apparatus using more than two wavelengths, specifications from multi-source agreements (MSAs), such as 100 G SWDM4 are used.

Due to the need for using the light adapter 205 and splitters, the required optical modulation amplitude (OMA) needs to be higher than the one specified in industry Standards. Experimental results using VCSELs with OMA>−2 dBm reduce the uncertainty of the measurements.

In 1520, additional requirements such as center wavelength, and spectral width as a function of temperature are measured and stored in memory. The variation of the same parameters under constant temperature is also evaluated. VCSELs with significant variation are discarded.

In 1530, the chromatic bandwidth, $F_{Ch}$ used in module 800, and not defined in Standards, is measured. The measurement method uses a fast signal generator, a high bandwidth oscilloscope, and a high bandwidth MMF, e.g. 12 GHz·km at the wavelength of interest, e.g., 850 nm, to minimize the modal dispersion effects. VCSELs with 4 GHz·km<$F_{Ch}$<10 GHz·km are selected in 1540.

As previously described, in order to minimize the impact of MSB and launch condition, a calibrated light adaptor is utilized, 205. The light adaptor consists of a mode mixer and mode filter. The mode mixer can be implemented using different technologies, e.g. a concatenated set of MMFs, each with different refractive index profiles such as step-index and graded-index, and in some cases with different core diameters. The mode filter can consist of a mandrel of determinate diameter on which the fiber is wrapped.

In 1550, for each VCSEL the light adapter, 205 is calibrated to provide a stable EF launch condition.

For calibration, the VCSEL with the light adapter, 205, is connected to a reference-grade fiber. A high-resolution imaging system is used to capture the near field intensity pattern from the reference fiber endface and the EF is computed. The EF of the launch is computed and compared with limits established in IEC 61280-4 shown in FIG. 9. The ideal EF should be in the center of these limits as shown in the same figure, as EF launch Tighter tolerances than the ones specified in IEC standards, can be used to improve accuracy on the EF-MB estimation.

The invention claimed is:

1. A test apparatus comprising:
   at least one optical source;
   a high-speed photodetector;
   a reflector
   a microcontroller or processor; and
   electrical circuitry to power and drive the at least one optical source, photodetector, and microcontroller or processor and for measuring a frequency response of a multimode optical fiber under test, wherein:
   the test apparatus utilizes an optical pulse waveform with a light adapter to measure a reflected signal of the optical pulse waveform created by the reflector in a channel under test and a real-time reference signal created from redirecting a small portion of the transmitted light to a reference fiber;
   the microcontroller of the apparatus uses a correction method to de-embed a chromatic bandwidth of the at least one optical source from an encircled flux modal chromatic bandwidth; and
   the correction method uses correction functions obtained for different type of Vertical Cavity Surface Emitting Lasers (VCSELs) to estimate an optical channel bandwidth when used with Vertical Cavity Surface Emitting Lasers (VCSELs) transceivers.

2. The test apparatus according to claim 1, wherein the apparatus verifies a specified data rate and maximum reach that can be supported over the multimode optical fiber under test.

3. The test apparatus according to claim 2, wherein the apparatus verifies that the specified data rate and maximum reach can be supported for multiple wavelengths.

4. The test apparatus according to claim 1, wherein a channel bandwidth for multiple wavelengths is measured.

5. The test apparatus according to claim 1 wherein the correction functions are obtained using reference fibers and further wherein the reference fibers have known values of dispersion and modal and chromatic bandwidth.

6. The test apparatus according to claim 5, wherein the reference fibers are measured with a spectral and temporal narrow source such as a mode locked Titanium Sapphire laser.

7. The test apparatus according to claim 1, wherein the light adapter is a mode conditioner that produce a mode power distribution inside the tolerances for encircle flux launch.

8. The test apparatus according to claim 1, wherein the test apparatus uses the correction method to de-embed the chromatic bandwidth of the source from the encircled flux modal chromatic bandwidth using polynomial fitting wherein the coefficients are obtained from a selected population of the VCSELs.

* * * * *